United States Patent
Seputis

(10) Patent No.: US 9,529,849 B2
(45) Date of Patent: Dec. 27, 2016

(54) ONLINE HASH BASED OPTIMIZER STATISTICS GATHERING IN A DATABASE

(71) Applicant: Edwin Seputis, Oakland, CA (US)

(72) Inventor: Edwin Seputis, Oakland, CA (US)

(73) Assignee: SYBASE, INC., Dublin, CA (US)

( * ) Notice: Subject to any disclaimer, the term of this patent is extended or adjusted under 35 U.S.C. 154(b) by 403 days.

(21) Appl. No.: 14/145,759

(22) Filed: Dec. 31, 2013

(65) Prior Publication Data

US 2015/0186464 A1  Jul. 2, 2015

(51) Int. Cl.
 *G06F 17/30* (2006.01)

(52) U.S. Cl.
 CPC ... *G06F 17/30469* (2013.01); *G06F 17/30457* (2013.01)

(58) Field of Classification Search
 CPC .............. G06F 17/30457; G06F 17/30469
 See application file for complete search history.

(56) References Cited

U.S. PATENT DOCUMENTS

| | | | |
|---|---|---|---|
| 5,794,229 A | 8/1998 | French et al. | |
| 6,263,345 B1 * | 7/2001 | Farrar | G06F 17/30454 700/110 |
| 6,697,794 B1 | 2/2004 | Milby | |
| 7,624,094 B2 | 11/2009 | Ellis et al. | |
| 7,702,806 B2 | 4/2010 | Gil et al. | |
| 7,769,744 B2 | 8/2010 | Waas et al. | |
| 7,778,996 B2 | 8/2010 | Burger | |
| 8,090,754 B2 | 1/2012 | Schmidt et al. | |
| 8,510,807 B1 | 8/2013 | Elazary et al. | |
| 2005/0102325 A1 | 5/2005 | Gould et al. | |
| 2005/0114368 A1 | 5/2005 | Gould et al. | |
| 2009/0150168 A1 | 6/2009 | Schmidt | |
| 2009/0150431 A1 | 6/2009 | Schmidt et al. | |
| 2009/0313208 A1 * | 12/2009 | Helfman | G06F 17/3033 |
| 2010/0257181 A1 | 10/2010 | Zhou et al. | |
| 2011/0228342 A1 | 9/2011 | Dolan | |
| 2012/0011108 A1 * | 1/2012 | Bensberg | G06F 17/3033 707/714 |
| 2012/0166401 A1 | 6/2012 | Li et al. | |

* cited by examiner

*Primary Examiner* — Dinku Gebresenbet
(74) *Attorney, Agent, or Firm* — Sterne, Kessler, Goldstein & Fox P.L.L.C.

(57) ABSTRACT

Disclosed herein are system, method, and computer program product embodiments for generating a histogram used to optimize a query plan. An embodiment operates by initializing a first thread and a second thread, such that the first thread processes a first section of a column and the second thread processes a second section of the column, concurrently with the first thread. The first thread generates a first hash table and the second thread generates a second hash table. The first and second hash tables represent data distribution stored in the respective first and second sections of the column. The first and second tables are merged into a histogram that represents data distribution in the column.

21 Claims, 18 Drawing Sheets

| Intermediate Histogram 210 | |
|---|---|
| boundary | row count |
| 10 | 100 |
| 30 | 300 |
| 35 | 100 |
| 51 | 200 |
| 60 | 200 |
| 91 | 100 |

| Normalized Final Histogram 406 | |
|---|---|
| boundary | row count |
| 10 | 0.1 |
| 30 | 0.3 |
| 35 | 0.1 |
| 51 | 0.2 |
| 60 | 0.2 |
| 91 | 0.1 | values is row count column total = 1.0

Descending merge of values <10

Ascending merge of values >91

1200A

| |
|---|
| 1024 |
| 2048 |
| 3072 |
| 4096 |
| 5119 |
| 6141 |
| 7164 |
| 8185 |
| 9210 |
| 10233 |
| 11253 |
| 12269 |
| 13291 |
| 14231 |
| 15332 |
| 16353 |
| 17373 |
| 18392 |
| 19412 |

Table 1

FIG. 12A

ONLINE HASH BASED OPTIMIZER STATISTICS GATHERING IN A DATABASE

BACKGROUND

Field

Embodiments relate to query optimization using memory caching techniques that include hash based statistics.

Background

Commercial database systems rely on caching techniques to improve performance. Caching techniques are often implemented in a memory cache that can be accessed quickly, such as random access memory (RAM), as opposed to storage that takes longer to access, such as disk-based storage. Cache memory typically stores frequently used data and reduces the time needed by a database system to access a data page in the disk-based storage. A cache memory, however, is much more costly than disk-based storage and is limited on a computing device.

One way to select an optimal query plan that retrieves and manipulates data in a database is to use data statistics. One way to gather data statistics is using a histogram. For example, a histogram of data in columns that affect query plan generation may be generated. Conventionally, to generate a histogram, data in columns is sorted to obtain cell boundaries having respective weights. This is conventionally performed as an iterative process by sorting runs in cache memory and spilling sorted runs to disk which are subsequently read during a merge phase and create new sorted runs. Because sorting column's data is a disk and memory intensive procedure and can adversely affect database usage, sorting is typically performed during off-hours. However, due to globalization and a general 24-hour/7-day need for database resources, off-hour windows are small or non-existent. This creates a need for generating a histogram that does not depend on expensive database procedures, such as a sort.

BRIEF DESCRIPTION OF THE DRAWINGS

The accompanying drawings are incorporated herein and form a part of the specification.

FIG. 12A is a diagram of a unique value table, according to an embodiment.

In the drawings, like reference numbers generally indicate identical or similar elements. Additionally, generally, the left-most digit(s) of a reference number identifies the drawing in which the reference number first appears.

DETAILED DESCRIPTION

Provided herein are system, method and/or computer program product embodiments, and/or combinations and sub-combinations thereof, for generating a histogram, where a histogram is included for generating an optimal query plan for a query.

Figure 1:
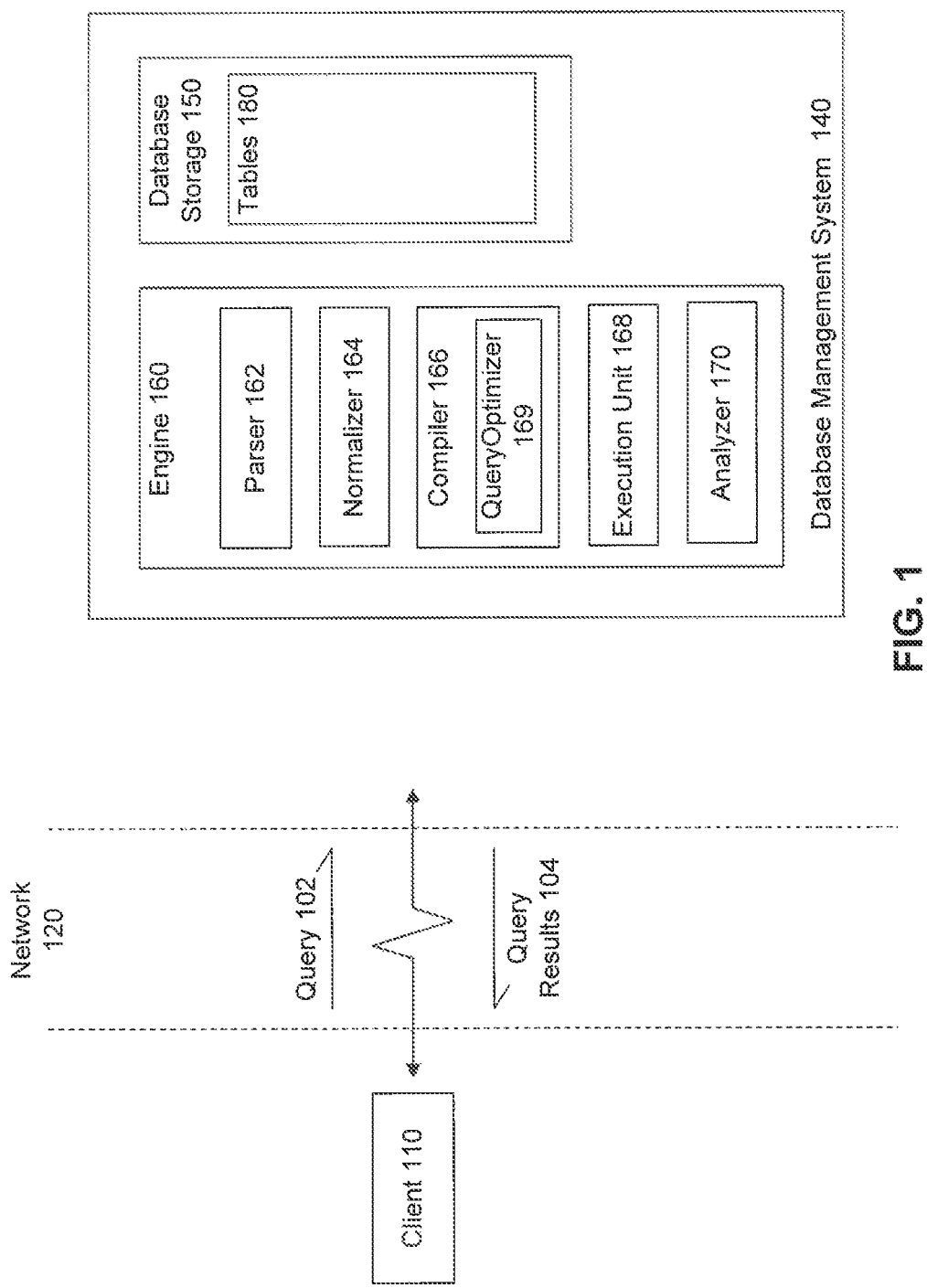
FIG. 1 is an example database computing environment in which various embodiments of the invention can be implemented.

FIG. 1 is an example database computing environment 100 in which embodiments can be implemented. A client 110 is operable to communicate with a database management system (DBMS), such as, DBMS 140. DBMS 140 may be a system executing on a server and accessible to client 110 over a network, such as network 120, described below. Although client 110 is represented in FIG. 1 as a separate physical machine from DBMS 140, this is presented by way of example, and not limitation. In an additional embodiment, client 110 occupies the same physical system as DBMS 140. In a further embodiment, client 110 is a software application which requires access to DBMS 140. In another embodiment, a user may operate client 110 to request access to DBMS 140. Throughout this specification, the terms client and user will be used interchangeably to refer to any hardware, software, or human requestor, such as client 110, accessing DBMS 140 either manually or automatically. Additionally, both client 110 and DBMS 140 may execute within a computer system, such as an example computer system discussed in FIG. 13.

Client 110 and DBMS 140 may communicate over network 120. Network 120 may be any network or combination of networks that can carry data communications. Such a network 120 may include, but is not limited to, a local area network, metropolitan area network, and/or wide area network such as the Internet.

DBMS 140 receives a query, such as query 102, from client 110. Query 102 is used to request, modify, append, or otherwise manipulate or access data in database storage 150. Query 102 is transmitted to DBMS 140 by client 110 using syntax which conforms to a query language. In a non-limiting embodiment, the query language is a Structured Query Language ("SQL"), but may be another query language. DBMS 140 is able to interpret query 102 in accordance with the query language and, based on the interpretation, generate requests to database storage 150.

Query 102 may be generated by a user using client 110 or by an application executing on client 110. Upon receipt, DBMS 140 begins to process query 102. Once processed, the result of the processed query is transmitted to client 110 as query result 104.

To process query 102, DBMS 140 includes a parser 162, a normalizer 164, a compiler 166, and an execution unit 168.

Parser 162 parses the received queries 102. In an embodiment, parser 162 may convert query 102 into a binary tree data structure which represents the format of query 102. In other embodiments, other types of data structures may be used.

When parsing is complete, parser 162 passes the parsed query to a normalizer 164. Normalizer 164 normalizes the parsed query. For example, normalizer 164 eliminates redundant data from the parsed query. Normalizer 164 also performs error checking on the parsed query that confirms that the names of the tables in the parsed query conform to the names of tables 180. Normalizer 164 also confirms that relationships among tables 180, as described by the parsed query, are valid.

Once normalization is complete, normalizer 164 passes the normalized query to compiler 166. Compiler 166 compiles the normalized query into machine-readable format. The compilation process determines how query 102 is executed by DBMS 140. To ensure that query 102 is executed efficiently, compiler 166 uses a query optimizer 169 to generate an access plan for executing the query.

Query optimizer 169 analyzes the query and determines an access plan for executing the query. The access plan retrieves and manipulates information in the database storage 150 in accordance with the query semantics. This may include choosing the access method for each table accessed, choosing the order in which to perform a join operation on the tables, and choosing the join method to be used in each join operation. As there may be multiple strategies for executing a given query using combinations of these operations, query optimizer 169 generates and evaluates a number of strategies from which to select the best strategy to execute the query.

To generate an access plan, query optimizer 169 divides a query into multiple subsets. Each subset may be part of a larger set that is a union of multiple subsets or be subdivided into other subsets. Query optimizer 169 then determines an access plan for each subset. Once the access plan for each subset is determined, query optimizer 169 combines the access plan for each subset to generate a best or optimal access plan for the query.

In one embodiment, in order for query optimizer 169 to generate an efficient query plan, DBMS 140 uses analyzer 170. Analyzer 170 performs statistical data analysis on data stored in tables 180. Data in tables 180 may be stored in columns, where each column includes multiple rows or records. Query optimizer 169 then uses the results of the data analysis to generate a query plan.

Analyzer 170 analyzes columns in table 180. In an embodiment, the frequency with which analyzer 170 analyzes data is determined by the system administrator. For example, the system administrator may set a job scheduler that allows a DBMS 140 to set up rules for running analyzer 170. In another example, a database administrator may set up a script that runs analyzer 170. Further, because analyzer 170 does not use a conventional approach that sorts data in columns of table 180, analyzer 170 does not interfere with data retrieval and manipulation in DBMS 140.

Figure 2A:
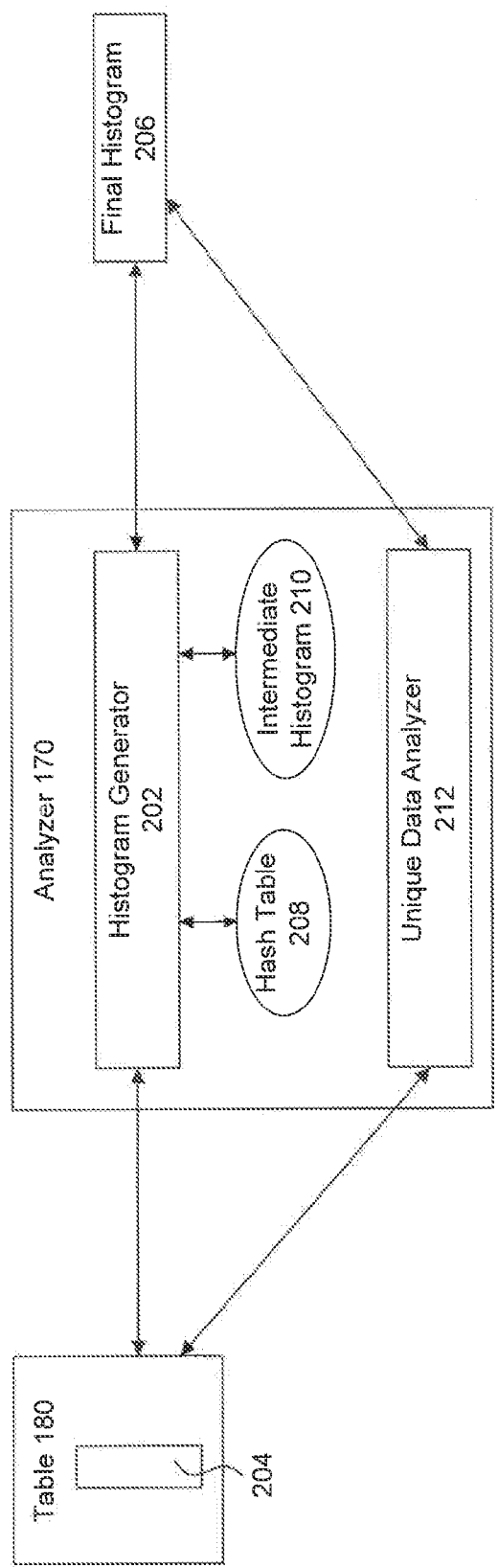
FIG. 2A is a block diagram of an analyzer, according to an embodiment.

FIG. 2A is a block diagram 200A of an analyzer, according to an embodiment.

Analyzer 170 includes a histogram generator 202. Histogram generator 202 identifies one or more interesting columns, such as interesting column 204 in table 180. Interesting column 204 may be a column that query optimizer 169 determines as relevant to generating an efficient query plan, and may be set as "interesting" either by DBMS 140 or by a system administrator. Interesting column 204 may be an indexed column, though the implementation is not limited to this example embodiment. Histogram generator 202 generates an intermediate histogram 210 and a final histogram 206 of data in interesting column 204. Final histogram 206 may be an ordered representation of data in interesting column 204 (in ascending or descending order) with a counter (also referred to as a weight) of how often a data having a particular value repeats in interesting column 204. Intermediate histogram(s) 210 may be histogram(s) of interesting column 204 before the data is merged into final histogram 206, as discussed below.

For example, if interesting column 204 stores ages of various individuals, histogram 206 may show that there is a spike at age 18, where a spike corresponds to interesting column 204 having multiple records representing individuals of 18 years of age. In another example, histogram 206 may show that interesting column 204 includes hardly any individuals that are of age 60. A conventional approach to generating a histogram is to sort the records in an interesting column according to their values and identify a number of times each value repeats based on the neighboring like records in the sorted interesting column. However, this conventional approach is memory and disk intensive, particularly on columns having millions of rows, and interferes with other DBMS operations, such as, data manipulation, storage, and retrieval.

Unlike a conventional approach, histogram generator 202 generates final histogram 206 of interesting columns 204 using hashing. Hashing may be performed using one or more hash functions that are known to a person of ordinary skill in the art. In one implementation, the same hash function is used to generate final histogram 206 of interesting column 204, though the implementation is not limited to this embodiment. For example, histogram generator 202 traverses interesting column 204 and generates a hash value for each record in the column. The hash value is used to index into the hash table 208 to find the hash bucket. Each hash bucket contains a list of descriptors, one descriptor for each of the respective unique values in interesting column 204 which had hashed to the same hash value. A descriptor may be a mathematical value that is identifies a unique value in interesting column 204.

Figure 2B:
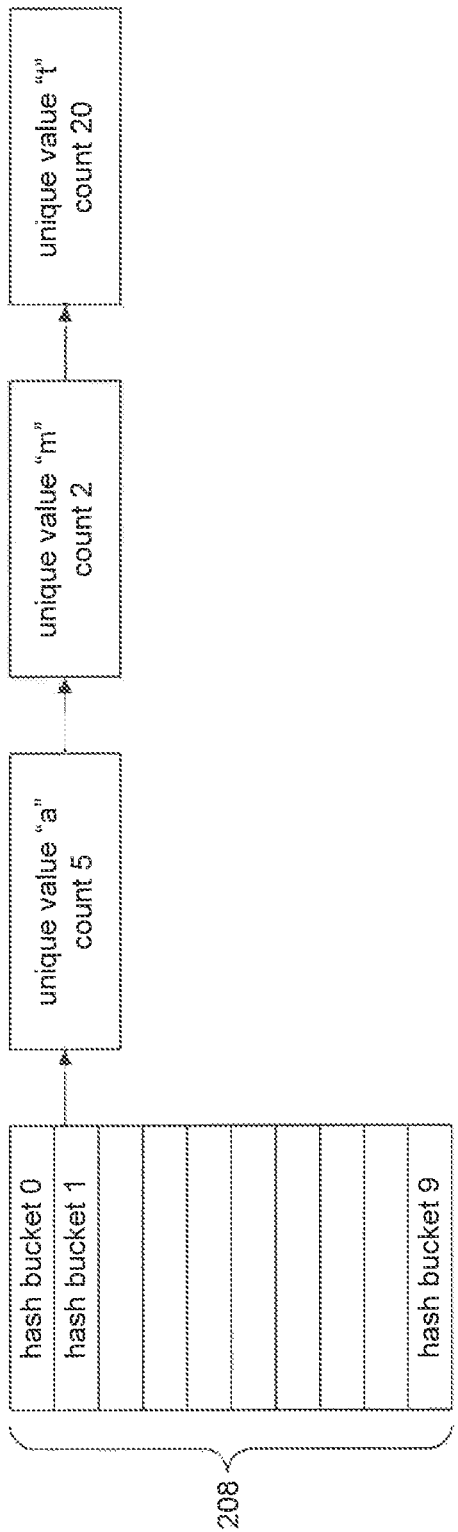
FIG. 2B is a block diagram of a hash table, according to an embodiment.

Histogram generator 202 stores the unique descriptors in a hash table 208. For example, FIG. 2B is a diagram 200B of a hash table, according to an embodiment. Hash table 208 may be generated using histogram generator 202 on interesting column 204 that includes alphabetical characters, though the implementation is not limited to this embodiment. In FIG. 2B, hash table 208 includes ten hash buckets, such as hash bucket 0 to hash bucket 9. Each hash bucket is associated with a linked list of unique descriptors, where each descriptor matches to a unique value in interesting column 204. For example, hash bucket 1 includes three unique descriptors that are associated with values "a", "m", and "t" in interesting column 204.

In an embodiment, each descriptor in hash table 208 is associated with a counter or weight. Histogram generator 202 increments the counter each time it traverses a record that already has a descriptor stored in hash table 208. Hence, the counter represents a number of times a record having a particular value is stored in interesting column 204. For example, descriptors associated with respective values "a", "m", and "t" have respective counters set to "5", "2", and "20" where the counters represent the number of times values "a", "m" and "t" are included in interesting column 204. This way, information about the distribution of records in interesting column 204 may be analyzed using counters associated with descriptors in hash table 208.

Returning to FIG. 2A, in an embodiment, histogram generator 202 generates final histogram 206 from one or more hash tables 208. Hash table 208 may store up to a maximum allowable number of records that include descriptors and a counter associated with each descriptor. Where interesting column 204 includes records with a low number of unique values, histogram generator 202 generates hash table 208 that fits descriptors for all records of interesting column 204 without reaching the maximum allowable number of records. In this embodiment, hash table 208 is directly transformed into final histogram 206 (and avoiding creation of intermediate histogram 210) once histogram generator 202 completes traversing interesting column 204.

Where interesting column 204 has a high number of unique records, descriptors for all records may not fit into a single hash table 208. In this case, histogram generator 202 generates an intermediate histogram 210 and then empties the hash table 208 into intermediate histogram 210 by clearing all descriptors so that they can be reused in a subsequent iteration. If histogram generator 202 once again fills hash table 208 in the subsequent iteration, then histogram generator 202 merges hash table 208 into the existing intermediate histogram 210. These iterations repeat until histogram generator 202 completes traversing interesting column 204. When histogram generator 202 completes traversing interesting column 204, it converts intermediate histogram 210 into final histogram 206, as discussed below.

Figure 3:
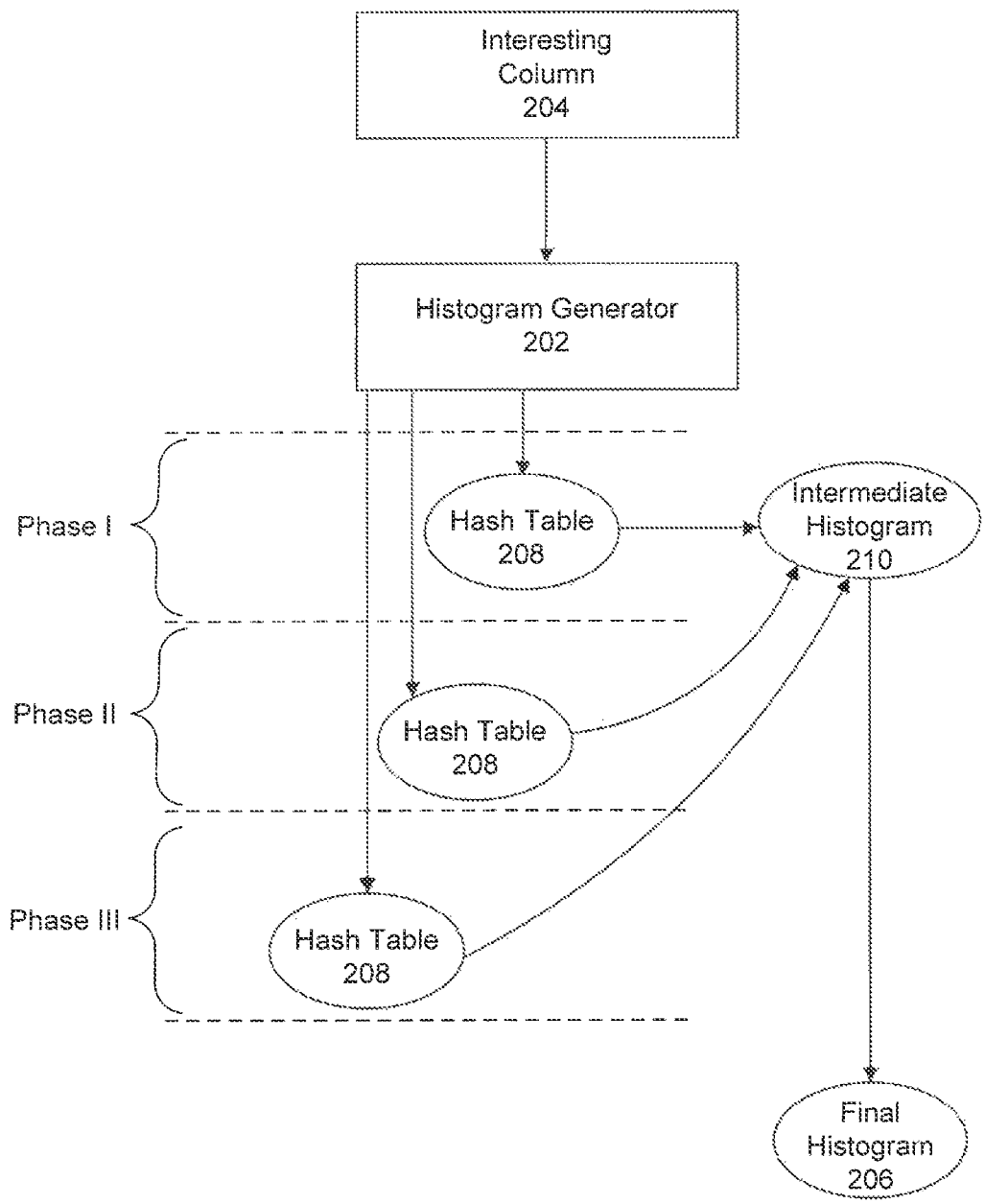
FIG. 3 is a block diagram of a histogram generator generating a final histogram, according to an embodiment.

FIG. 3 is a block diagram 300 of a histogram generator generating a final histogram, according to an embodiment. In example block diagram 300, histogram generator 202 generates more descriptors than the maximum allowable number of records that can be stored in hash table 208. To track the records, histogram generator 202 generates intermediate histogram 210 and empties the descriptors in hash table 208 into intermediate histogram 210. In FIG. 3, this scenario occurs three times: in phase I, phase II and phase III. When histogram generator 202 completes traversing interesting column 204, histogram generator 202 converts intermediate histogram 210 into final histogram 206.

For example, in phase I histogram generator 202 generates a first hash table 208. As histogram generator 202 traverses interesting column 204 and generates a descriptor for each record, histogram generator 202 stores descriptors into hash table 208. This process continues until hash table 208 reaches a maximum allowable number of records that can be stored in hash table 208. As discussed above, a record includes a descriptor and an associated counter. A maximum allowable number of records that can be stored in hash table 208 may be configured within DBMS 140 based on computer system settings or by a system administrator. Once hash table 208 stores the maximum allowable number of records, histogram generator 202 merges hash table 208 into intermediate histogram 210. If hash table 208 is a first hash table 208 that reaches the maximum allowable number of records, then histogram generator 202 creates an initial intermediate histogram 210. Intermediate histogram 210 summarizes information from descriptors and the associated counters from hash table 208 generated during phase I.

Histogram generator 202 then begins phase II. In phase II, histogram generator 202 recycles existing descriptors as well as reuses the existing hash table 208 and begins storing descriptors into hash table 208. Histogram generator 202 continues to store descriptors into hash table 208 until hash table 208 reaches the maximum allowable number of descriptors. The descriptors may be in-range descriptors or out-of-range descriptors. In-range descriptors contain values that fall within the range of values stored in intermediate histogram 210, while out-of-range descriptors are descriptors that contain values outside the minimum and maximum values represented by the intermediate histogram 210. Both in-range and out-of-range descriptors are discussed in detail in FIG. 5B. In an embodiment, once hash table 208 reaches the maximum allowable number of out-of-range descriptors, histogram generator 202 merges hash table 208 into intermediate histogram 210, as described below.

After the merge, histogram generator 202 begins phase III. In phase III, histogram generator 202 continues the above process and reuses the existing hash table 208. This process continues until histogram generator 202 completes the traversal of interesting column 204 or hash table 208 becomes full. Once histogram generator meets one of those two conditions, histogram generator 202 merges hash table 208 with intermediate histogram 210.

For exemplary purposes, suppose histogram generator 202 completes traversing interesting column 204 in phase III. At this point, a final normalized histogram 206 is created. The difference between intermediate histogram 210 and final normalized histogram 206 is that the former is optimized for accurate concurrent row counting (using, for example, 64 bit integers) with specialized atomic additions when using parallelism, and the latter is designed for subsequent optimizer usage with floating point weights that are fractions of 1.0 and that are summed to equal 1.0.

Figure 4:
FIG. 4 is a block diagram of an intermediate histogram and a normalized final histogram, according to an embodiment.

FIG. 4 is a diagram 400 of an intermediate and a final normalized histogram, according to an embodiment.

In FIG. 4, intermediate histogram 210 and normalized final histogram 406 both have cells "10", "30", "35", "51", "60", and "91", each cell is associated with a count. A cell may be a frequency cell or a range cell. A frequency cell contains a unique value. Example cells in FIG. 4 are frequency cells. A range cell contains a range of values. For example, a range cell may have a range of values from 10 to 15, and be designated as "10-15" (not shown). The count signifies a number of times a value within a frequency cell or values within a range cell repeat in intermediate histogram 210 and normalized final histogram 406. In an embodiment, counts in intermediate histogram 210 are integer values and can be updated using hardware supported atomic addition. Example counts in intermediate histogram 210 are "100", "300", "100", "200", "200", and "100" and are associated with respective cells.

In an embodiment, counts in normalized final histogram 406 are normalized, such that the sum of all counts is equal to one. Example counts in normalized final histogram 406 are "0.1", "0.3", "0.1", "0.2", "0.2", and "0.1", where the sum of the counts is equal to "1".

Figure 5A:
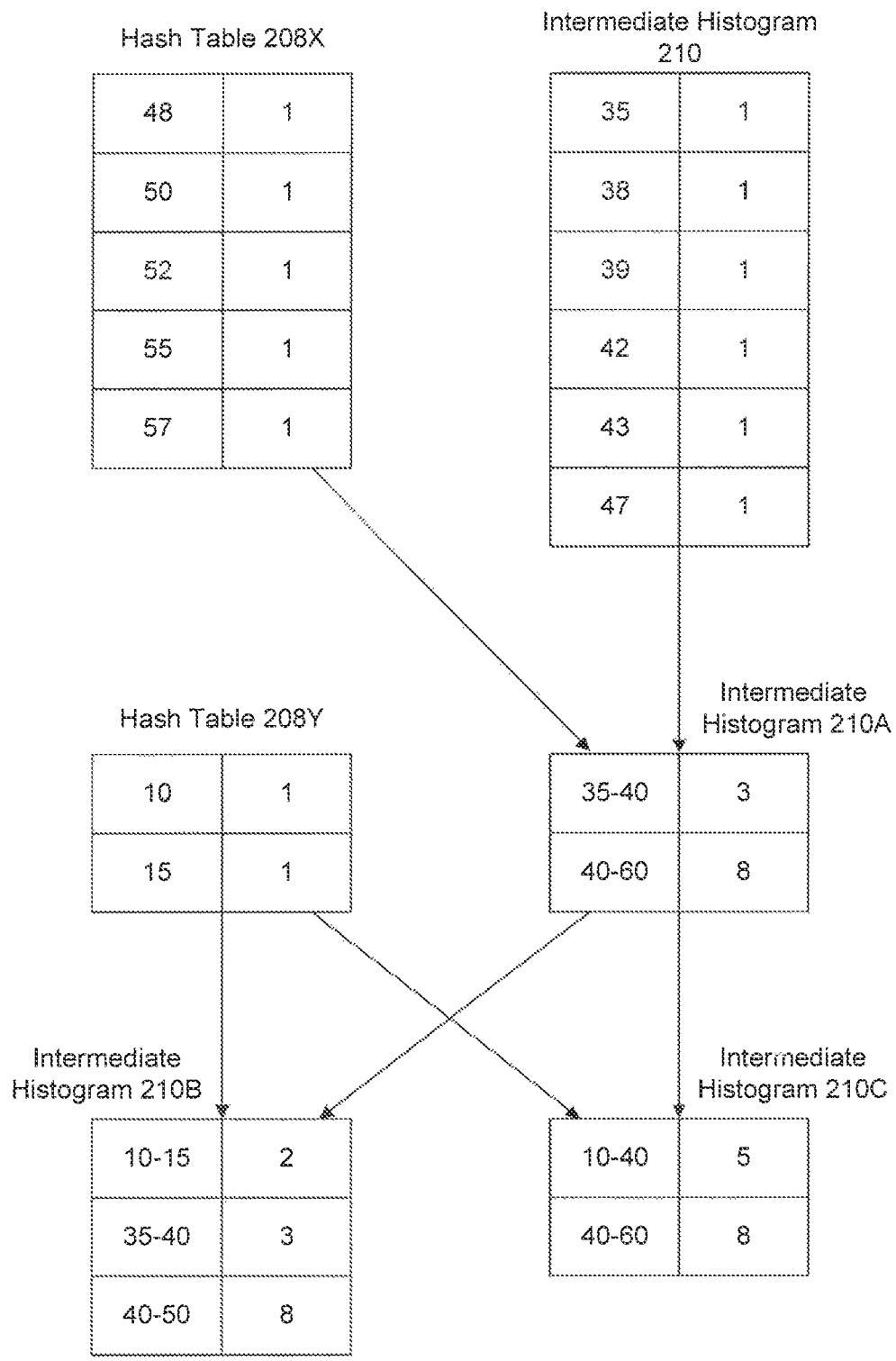
FIG. 5A is a diagram of a histogram generator merging a hash table into an intermediate histogram, according to an embodiment.

As discussed in FIG. 3, histogram generator 202 merges hash table 208 into intermediate histogram 210. FIG. 5A is a diagram 500A of a histogram generator merging a hash table into an intermediate histogram, according to an embodiment.

In an embodiment, intermediate histogram 210 is an "equiweight" histogram. In an "equiweight" histogram, each cell represents a range of values such that a counter associated with a cell is of approximately the same value as counters associated with other cells. Thus values or range of values stored in a cell are not set to a predefined value or range of values, but rather vary such that the value of counters associated with each cell is approximately the same.

For example, suppose hash tables 208X and intermediate histogram 210 include eight cells between them, where the cells represent individuals of ages between 40 and 60, as shown in FIG. 5A. Also suppose intermediate histogram 210 includes three cells that represent individuals of ages between 35 and 40. Cells in hash tables 208X and intermediate histogram 210 may be merged into intermediate histogram 210A such that intermediate histogram 210A includes one cell for a range of ages between 40 and 60 with a counter of 8, and a second cell with a range of ages between 35 and 40 with a counter of 3.

In an embodiment, a system administrator may set up guidelines for a number of cells that are stored in intermediate histogram 210, such as 100 to 200 cells, though the implementation is not limited to this embodiment. The guidelines may reduce the amount of memory that is allocated to intermediate histogram 210.

In an embodiment, histogram generator 202 combines cells in hash table 208X with intermediate histogram 210 according to the predefined guidelines. One way histogram generator 202 stays within the predefined guidelines is by combining adjacent records in intermediate histogram 210 that have a low counter value, but not a high counter value, while ensuring that the records are maintained in an ascending order.

In an embodiment, histogram generator 202 generates hash table 208Y that is also to be merged with intermediate histogram 210A. Hash table 208Y may include values that fall outside of the cell ranges included in intermediate histogram 210A. For example, hash table 208Y may include two records for individuals between ages between 10 and 15. To merge hash table 208Y into intermediate histogram 210A, histogram generator 202 may create a new cell with a new range for ages between 10 and 15 as shown in intermediate histogram 210B. Alternatively, histogram generator 202 may also increase the cell range of an age group between ages 35 and 40 to 10 and 40 as shown as intermediate histogram 210C, and increment the counters accordingly.

Figure 5B:
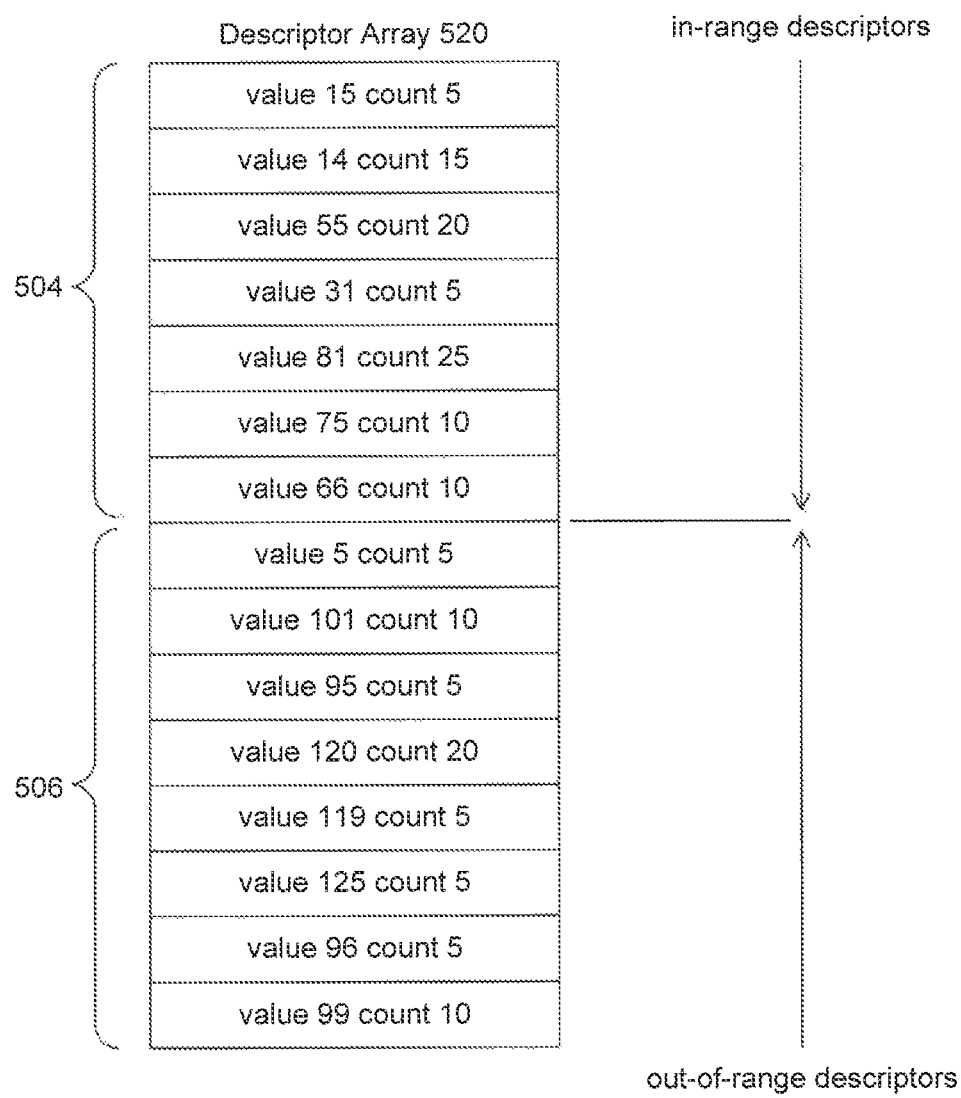
FIG. 5B is a diagram of a descriptor array of a hash table that stores in-range descriptors and out-of-range descriptors, according to an embodiment.

In an embodiment, in order to reduce the number of iterations which merge hash table 208 values into the intermediate histogram 210, a descriptor array in hash table 208 is divided into the in-range descriptors and out-of-range descriptors. FIG. 5B is a diagram 500B of a descriptor array of a hash table that stores in-range descriptors and out-of-range descriptors, according to an embodiment. Block diagram 500B includes a descriptor array 520 of hash table 208. Descriptor array 520 may be an array, a list or another data structure stored in one of memories that are described in greater detail below in conjunction with FIG. 13. Descriptor array 520 may be divided into two memory stacks, such as an in-range stack 504 and an out-of-range stack 506.

In-range stack 504 stores in-range descriptors. An in-range descriptor is a descriptor that includes the value that is in-between the maximum and minimum values of the intermediate histogram 210. In an embodiment, in-range descriptors may also include the maximum and minimum values in intermediate histogram 210 in addition to the in-between values.

Out-of-range stack 506 stores out-of-range descriptors. An out-of-range descriptor is a descriptor that includes the value that is outside the maximum and minimum values of the existing intermediate histogram 210. For purposes of FIG. 5B, the existing intermediate histogram 210 may be the intermediate histogram described in FIG. 4. Based on intermediate histogram 210 in FIG. 4, descriptor array in FIG. 5B includes in-range descriptors associated with values between 10 and 91, and out-of-range descriptors associated with values less than 10 and greater than 91.

If all available descriptors in hash table 208 become occupied and a new descriptor is required because the unique value associated with the new descriptor is not associated with any existing descriptors, then histogram generator 202 merges the descriptors in hash table 208 with each other and creates room for a new descriptor. For example, if the new value is associated with an out-of-range descriptor, then histogram generator 202 discards the next available in-range descriptor adjacent to the out-of-range stack 504 to make room for the new value and the associated descriptor. For example, in FIG. 5B, the descriptor associated with value 66 count 10 would be discarded. Alternatively, if the new value is associated with the in-range descriptor, then a random in-range descriptor is discarded to make room for a new value and the associated descriptor. When a descriptor is discarded, histogram generator 202 may merge a discarded descriptor into the existing intermediate histogram 210. The end result is that when histogram generator 202 merges the descriptors in hash table 208 into the intermediate histogram 210, all descriptors in hash table 208 have out-of-range values.

Figure 5C:
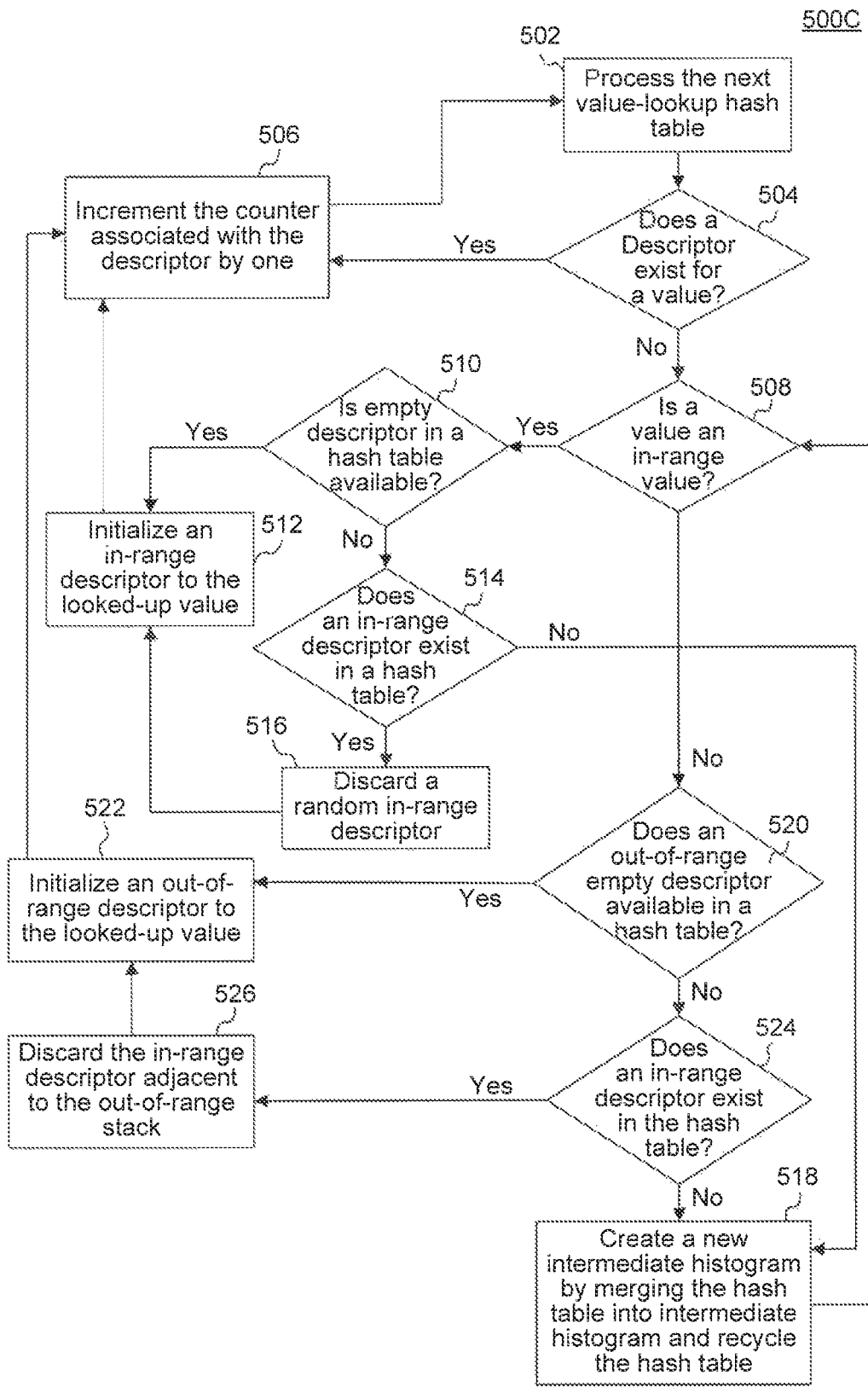
FIG. 5C is a flowchart of a method for inserting descriptors into a hash table, according to an embodiment.

FIG. 5C is a flowchart of a method 500C of inserting descriptors into a hash table, according to an embodiment. Method 500C can be performed by processing logic that can comprise hardware (e.g., circuitry, dedicated logic, programmable logic, microcode, etc.), software (e.g., instructions run on a processing device), or a combination thereof. In one implementation, the method 500C is performed by histogram generator 202, as described above.

At operation 502, the histogram generator retrieves a value from an interesting column. For example, histogram generator 202 retrieves a value in interesting column 204. As discussed above, a column is interesting when it is relevant in generating an efficient query plan for a query.

At operation 504, the histogram generator determines whether a descriptor that is associated with the value exists in hash table 208. If the descriptor exists, histogram generator 202 increments the counter that is associated with the descriptor at operation 506. For example, histogram generator 202 increments a counter that tracks the number of times the value that is associated with descriptor in hash table 208 repeats in interesting column 204. Method 500C and/or a portion of method 500C may be iterative. The number of iterations may be based on the number of values in interesting column 204. For example, after operation 506, histogram generator 202 may proceed to operation 502 and may repeat portions of method 500C as long as histogram generator 202 continues to traverse interesting column 204.

If a descriptor that is associated with a value does not exist in hash table 208 at operation 504, histogram generator 202 determines whether the value is an in-range value at operation 508. For example, histogram generator 202 determines whether the value is in-range based on the minimum and maximum values included in intermediate histogram 210. If the value is an in-range value, the histogram generator 202 proceeds to operation 510. If the value is not an in-range value, histogram generator 202 proceeds to operation 520.

At operation 510, the histogram generator determines whether a descriptor in a hash table is available. For example, histogram generator 202 in histogram generator 202 determines whether there is an empty descriptor in hash table 208. An example of a descriptor that is available is an empty descriptor that is not associated with a value in hash table 208. If there is an empty descriptor in hash table 208, histogram generator 202 proceeds to operation 512. If there is not an empty descriptor in hash table 208, histogram generator 202 proceeds to operation 514.

At operation 512, the histogram generator initializes the available descriptor. For example, histogram generator 202 associates the available descriptor with the value that is retrieved at operation 502. After operation 512, histogram generator 202 proceeds to operation 506, described above.

At operation 514, the histogram generator determines whether an in-range descriptor exists in hash table 208. For example, histogram generator 202 determines whether a descriptor has previously been assigned to an in-range value in hash table 208. If an in-range descriptor exists, histogram generator 202 proceeds to operation 516. If an in-range descriptor does not exist, histogram generator 202 proceeds to operation 518.

At operation 516, the histogram generator discards a random in-range descriptor. For example, histogram generator 202 discards a random in-range descriptor in hash table 208 to make room for the descriptor associated with the value looked-up in operation 502. After operation 516, histogram generator 202 proceeds to operation 512, where histogram generator 202 initializes a descriptor associated with the looked-up value in place of the descriptor discarded in operation 516.

At operation 514, if an in-range descriptor does not exist, histogram generator 202 proceeds to operation 518. At operation 518, histogram generator 202 merges hash table 208 with intermediate histogram 210, as discussed above. Once histogram generator 202 completes the merge, histogram generator 202 recycles hash table 208 by clearing descriptors in hash table 208 so that the descriptors are empty can be assigned to new values. Histogram generator 202 proceeds to operation 508, where histogram generator 202 attempts to associate the value retrieved at operation 502 with a descriptor in hash table 208 that now includes empty descriptors.

At operation 508, when a looked-up value is out-of-range, histogram generator 202 proceeds to operation 520. At operation 520, histogram generator 202 determines whether there is an empty out-of-range descriptor. If there is an empty out-of-range descriptor, the histogram generator 202 proceeds to operation 522. If there is not an empty out-of-range descriptor, histogram generator 202 proceeds to operation 524.

At operation 522, the histogram generator initializes an out-of-range descriptor. For example, histogram generator 202 initializes an out-of-range descriptor and associates the initialized out-of-range descriptor with the value that is determined at operation 502. Once the out-of-range descriptor is initialized, histogram generator 202 proceeds to operation 506, described above.

If, at operation 520 there is not an empty descriptor, histogram generator 202 proceeds to operation 524. At operation 524, histogram generator 202 determines whether an in-range descriptor exists. For example, histogram generator 206 determines whether an in-range descriptor exists. If an in-range descriptor exists, the analyzer proceeds to operation 526. If an in-range descriptor does not exist, the analyzer proceeds to operation 518, described above.

At operation 526, the histogram generator 202 discards an adjacent in-range descriptor. For example, histogram generator 202 may discard an in-range descriptor that is adjacent to the out-of-range stack 506 in hash table 208. Once the out-of-range descriptor is discarded, histogram generator 202 proceeds to operation 522, described above.

Method 500C or one or more portions of method 500C continues until histogram generator 202 completes traversing interesting column 204.

Figure 6:
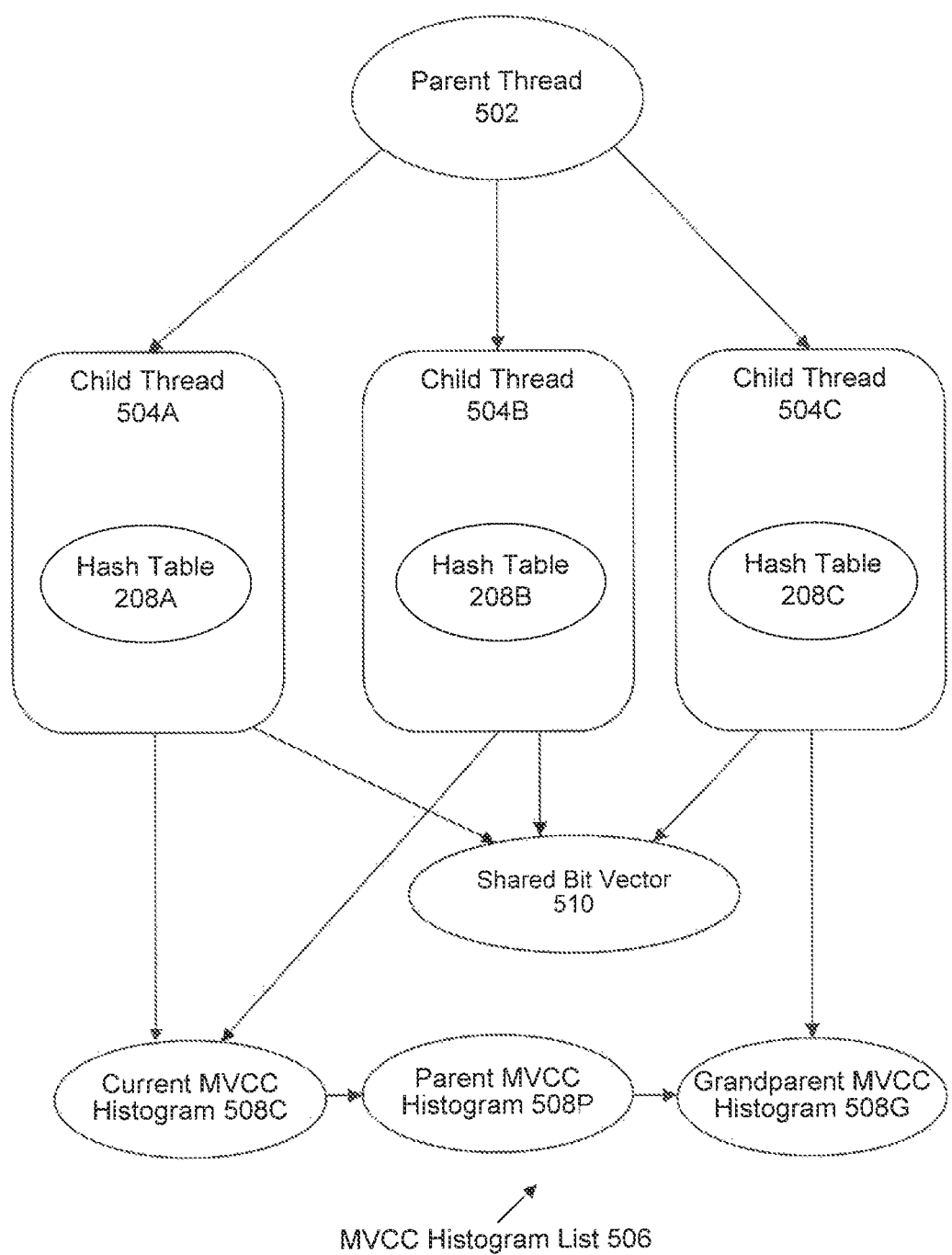
FIG. 6 is a block diagram of a multithreaded histogram generator, according to an embodiment.

In an embodiment, histogram generator 202 uses multi-threading to generate final histograms 206. FIG. 6 is a block diagram 600 of an example of a multi-threaded histogram, according to an embodiment. For example, histogram generator 202 generates a parent thread 502 (or is itself a parent thread 502). Parent thread 502 generates one or more child threads 504 up to a predefined maximum number of child threads 504. Parent thread 502 then divides interesting column 204 into sections and assigns a section to each child thread 504 to process in parallel with other child threads 504. As child threads 504 execute in parallel, child threads 504 generate hash tables 208 for the assigned sections. For illustrative purposes, FIG. 6 includes child threads 504A, 504B, and 504C, collectively referred to as child threads 504.

During execution, each child thread 504 generates hash tables 208. For example, child thread 504A generates a hash table 208A, child thread 504B generates a hash table 208B and child thread 504C generates a hash table 208C. When a sum of unique descriptors in any of hash tables 208A-C associated with respective child threads 504A-C is greater than the maximum allowable number of descriptors in hash tables 208A-C, the associated child threads 504A-C generate an intermediate histogram 210. However, each of child threads 504A-C may share the boundaries of the cell ranges in intermediate histograms 210 with other child threads 504A-C. The sharing of boundaries in intermediate histograms 210 produces accurate weights for the cells in normalized final histogram 406 (discussed in FIG. 4).

To share intermediate histograms 210, child threads 504A-C generate a multi version concurrency control (MVCC) histogram list 506. MVCC histogram list 506 includes histograms 210, referred to as MVCC histograms 508C, 508P and 508G (collectively referred to as MVCC histograms 508) in FIG. 6, and that are created and shared by multiple child threads 504A-C.

MVCC histograms 508C, 508P and 508G are histograms 210 combined with functions for manipulating MVCC histograms 508C, 508P and 508G in MVCC histogram list 506. MVCC histogram list 506 may be stored in one of memory storages described in greater detail below in conjunction with FIG. 13.

In example block diagram 600, MVCC histogram 508C is a current MVCC histogram, MVCC histogram 508P is apparent MVCC histogram and MVCC histogram 508G is a grandparent MVCC histogram. Grandparent MVCC histogram 508G was the first histogram 508 generated by one of child threads 504A-C. Subsequently, parent MVCC histogram 508P and current MVCC histogram 508C were generated by the same or different one of child threads 504A-C, in the respective order.

In an embodiment, in order to increase thread concurrency, multiple child threads 504 may be working on different MVCC histograms 508C, 508P and 508G in MVCC histogram list 506. To maintain consistency, the older versions of MVCC histograms 508, such as, 508P and 508G should be merge compatible with the newer versions of MVCC histograms 508, such as 508C. Merge compatible refers to values in one or more cells in the older versions of MVCC histograms 508P and 508G being able to fit into one cell of a newer version of MVCC histogram 508C. For example, MVCC histogram 508P should be merge compatible with MVCC histogram 508C. In another example, MVCC histogram 508G should be merge compatible with MVCC histogram 508P and MVCC histogram 508C. For illustrative purposes, suppose MVCC histogram 508P includes two cells, where the first cell represents data for ages between 30 and 35, and the second cell represents data for ages from 35 to 40. MVCC histogram 508C may have a cell that represents ages from 30 to 40. Thus, the two cells with ranges 30-35 and 35-40 in MVCC histogram 508P fit into a single cell with a range of 30-40 in MVCC histogram 508C.

To share MVCC histogram 508, child thread 504A determines whether it is the first child thread 504 that uses one of MVCC histograms 508C, 508P or 508G in MVCC histogram list 506. If child thread 504A is the first thread that requires MVCC histogram 508, child thread 504A generates MVCC histogram 508C, and places MVCC histogram 508C into MVCC histogram list 506. Because MVCC histogram list 506 is accessible to other child threads 504 (504B and 504C), MVCC histograms 508C, 508P and 508G in MVCC histogram list 506 are also accessible to child threads 504B and 504C.

In an embodiment, child threads 504A-C attempt to reference the most recently created MVCC histogram 508, such as MVCC histogram 508C. For example, out of three MVCC histograms 508C, 508P and 508G in MVCC histogram list 506, if child thread 504C requires MVCC histogram 508, child thread 504C will reference MVCC histogram 508C or generate a new MVCC histogram 508C. Once child thread 504C begins referencing MVCC histogram 508C, child thread 504C continues to reference the same MVCC histogram 508 until hash table 208 associated with child thread 504C becomes full.

Notably, as child threads 504, such as child threads 504A-B also generate new MVCC histograms 508, subsequently to child thread 504C, MVCC histogram 508C referenced by child thread 504C may become MVCC histogram 508P or MVCC histogram 508G. For example, child thread 504C may reference MVCC histogram 508C that is no longer the most recent MVCC histogram 508C. This occurs when a more current MVCC histogram 508C was created after child thread 504C began referencing MVCC histogram 508C, causing MVCC histogram 508C to become MVCC histogram 508P, and MVCC histogram 508P to become MVCC histogram 508G.

For example, child thread 504C may reference an older MVCC histogram 508, such as MVCC histogram 508P or MVCC histogram 508G. If child thread 504C references an older MVCC histogram 508, such as 508P or 508G, child thread 504C will reference the older MVCC histogram 508 (508P or 508G) until hash table 208 associated with child thread 504C includes only out-of-range descriptors. As this point, child thread 504C will begin to reference the most current MVCC histogram 508 (such as current MVCC histogram 508C) and reassign out-of-range descriptors in its hash table 208 to the in-range descriptors according to the minimum and maximum values in current MVCC histogram 508C. Child thread 504C will also attempt to merge the previously referenced MVCC histogram 508 (508P or 508G) into current MVCC histogram 508C, as discussed below.

In an alternative embodiment, if child thread 504C is currently working on the most current MVCC histogram, such as MVCC histogram 508C, and has reached a point where its hash table 508 includes only out-of-range descriptors, then child thread 504C will create a new MVCC histogram 508 by merging current MVCC histogram 508C with descriptors from child thread's 504C hash table. When child thread 504C completes generating the new MVCC histogram 508, the new MVCC histogram 508 is placed at be beginning of MVCC histogram list 506 (not shown) and becomes MVCC histogram 508C, while the older MVCC histogram 508C becomes MVCC histogram 508P, and the older MVCC histogram 508P becomes MVCC histogram 508G, and so forth.

In an embodiment, child threads 504A-C generate the new MVCC histograms 508 asynchronously for increased concurrency.

In an embodiment, child thread 504A-C may use a spinlock to update histogram list 506. A person skilled in the art will appreciate that a spinlock ensures that a single child thread 504, such as child thread 504B, inserts a single MVCC histogram 508, such as MVCC histogram 508C into MVCC histogram list 506 at a time.

In an embodiment, multiple child threads 504, such as child threads 504B and 504C may attempt to insert a new MVCC histogram 508 into MVCC histogram 506 at the same time. However, because of the spinlock, either child thread 504B or child thread 504C will successfully insert the new MVCC histogram 508 as MVCC histogram 508C. In this embodiment, if child thread 504B has successfully inserted the new MVCC histogram 508, the unsuccessful child threads 504C may delete the newly generated MVCC histogram 508 that child thread 504C has created and was unable to insert into MVCC histogram list 506. Instead, child thread 504C will merge its hash tables 208 into current MVCC histogram 508C successfully inserted using child thread 504B.

In an embodiment, when child thread 504C merges hash table 208C into the new MVCC histogram 508, such as current MVCC histogram 508C, child thread 504C merges the in-range descriptors but not the out-of-range descriptors included in hash table 208C into current MVCC histogram 508C. The in-range and out-of-range descriptors are determined from a point of view of current MVCC histogram 508C. To merge out-of-range descriptors, child threads 504A-C may defer to parent thread 502 when child threads 504A-C have completed traversing the respective sections of interesting column 204. Parent thread 502 may merge out-of-range descriptors into current MVCC histogram 508C or create a new MVCC histogram 508, as discussed below.

To keep track of a number of child threads 504A-C that reference one of MVCC histograms 508C, 508P and 508G, each of MVCC histograms 508C, 508P and 508G include a usage counter. For example, each time any of child threads 504A-C reference one of MVCC histograms 508C, 508P or 508G, child threads 504A-C increment the usage counter. For example, if child thread 504A references MVCC histogram 508C, child thread 504A increments the usage counter of MVCC histogram 508C. When child thread 504A completes using MVCC histogram 508C and merges hash table 208 into current MVCC histogram 508C, child thread 504A decrements the usage counter.

In another example, illustrated in FIG. 6, two child threads 504A and 504B use MVCC histogram 508C. As such, the usage counter associated with MVCC histogram 508C is equal to two. In another example, child thread 504C uses MVCC histogram 508G. As such, the usage counter associated with MVCC histogram 508G is equal to one. However, since no child threads 504A-C are referencing MVCC histogram 508P, the usage count for MVCC histogram 508P is equal to zero.

Figure 7A:
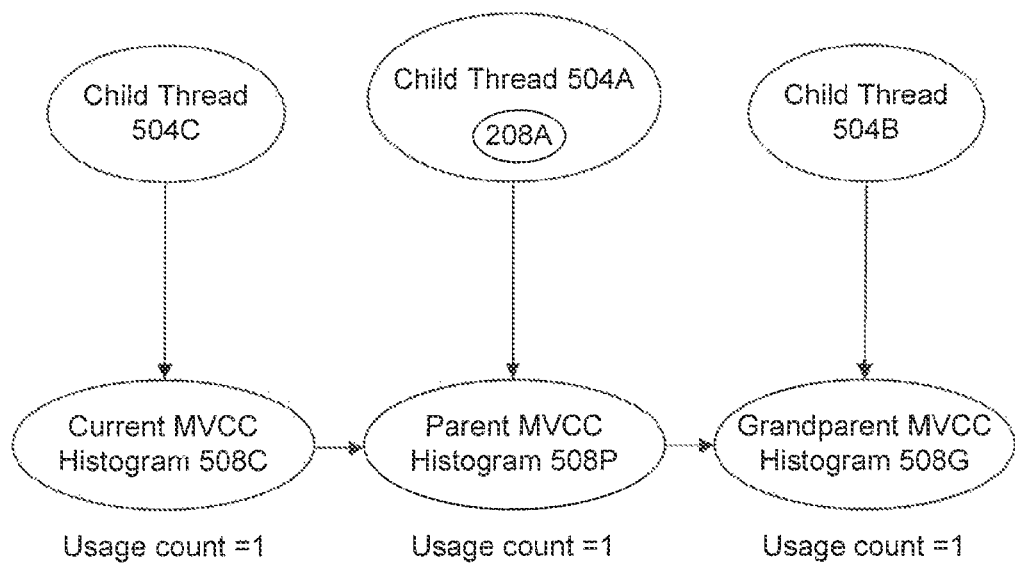
FIGS. 7A-B are block diagrams of a multiversion concurrency control histogram list, according to an embodiment.
Figure 7B:
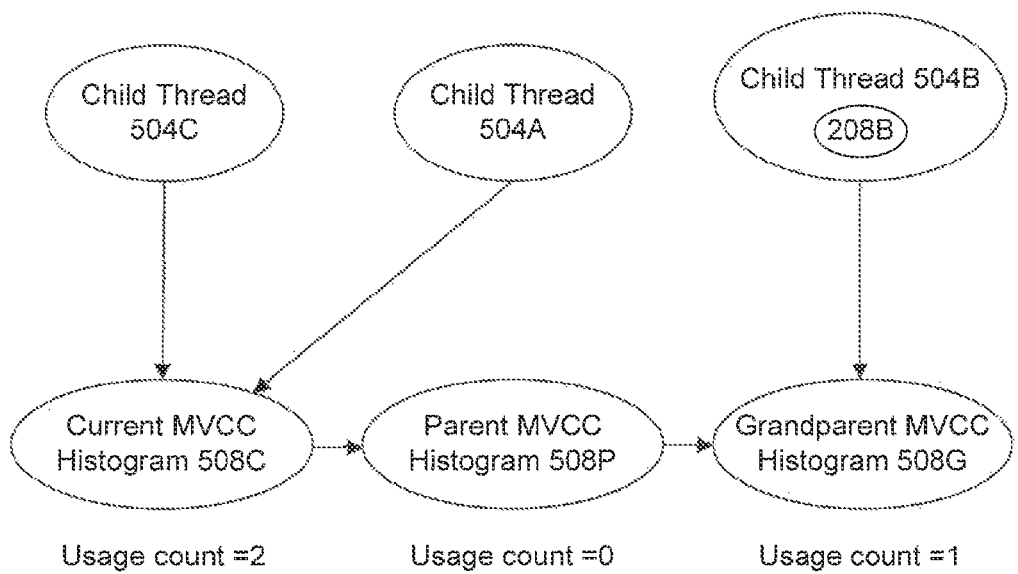

In an embodiment, if the usage counter reaches zero and there are no older MVCC histograms 508 remaining, such as when child thread 504C completes using MVCC histogram 508G, then child thread 504C merges MVCC histogram 508G with MVCC histogram 508C, as discussed in detail in FIGS. 7A-B below. The merge includes moving counter values associated with descriptors from MVCC histogram 508G to current MVCC histogram 508C.

As the traversal of interesting column 204 continues, all child threads 504, such as child threads 504A-C, merge MVCC histograms 508C, 508P and 508G that child threads 504A-C reference into MVCC histogram 508C. This results in MVCC histogram 508C being the only remaining histogram in MVCC histogram list 506 when all child threads 504A-C complete traversing their respective sections of interesting column 204. At this point, parent thread 502 merges descriptors remaining in hash tables 508A-C of the respective child threads 504A-C into current MVCC histogram 508C and subsequently creates the final histogram 206 (not shown), such as normalized final histogram 406 (not shown). The diagram that describes parent thread 502 generating final histogram 206 is discussed in detail in FIGS. 8A-D below.

In an embodiment, child thread 504, such as child thread 504A references MVCC histogram 508 in MVCC histogram list 506 when child thread 504 discards an in-range descriptor from child thread's 504A hash table 208A. As discussed in FIG. 5B, child thread 504 discards an in-range descriptor when hash table 208 becomes full and does not have empty descriptors that could be associated with a value. If child thread 504A discards an in-range descriptor for the first time, child thread 504A references the most recent MVCC histogram 508 that exists in MVCC histogram list 506, such as current MVCC histogram 508C. Once child thread 504A references MVCC histogram 508C, child thread 504A increments the usage counter to prevent other child threads 504, such as child threads 504B and 504C from discarding the referenced MVCC histogram 508C.

Once child thread 504, such as child thread 504C references a particular MVCC histogram 508, such as MVCC histogram 508G, child thread 504C remains attached to MVCC histogram 508G until hash table 208C includes only out-of-range descriptors. At this point, child thread 504C either merges or attempts to merge the descriptors and the associated counter weights in MVCC histogram 508G into MVCC histogram 508C at merge time, or generate a new MVCC histogram 508, and sets the new MVCC histogram to MVCC histogram 508C. Subsequently, child thread 504C dereferences the referenced MVCC histogram 508G.

In an embodiment, if child thread 504, such as child thread 504C decrements the usage counter of the attached MVCC histogram 508, such as MVCC histogram 508G to zero, and there are no parent MVCC histograms 508P where usage counter is greater than zero, then child thread 504C merges MVCC histogram 508G with current MVCC histogram 508C. After the merge, child thread 504C discards MVCC histogram 508G and frees memory space. If the referenced MVCC histogram 508 is MVCC histogram 508C (not shown), child thread 504C may generate a new MVCC histogram 508. Otherwise, child thread 504C increments the usage counter of current MVCC histogram 508C and continues to process its section of interesting column 204.

In an embodiment, if child thread 504, such as child thread 504C decrements the usage counter of the referenced MVCC histogram 508, such as MVCC histogram 508P to zero, and there is a parent MVCC histogram 508G where usage counter is greater than zero, and MVCC histogram list 506 includes MVCC histogram 508C, child thread 504C merges its hash table 208C into the most current MVCC histogram 508C and does not merge the MVCC histogram 508P or 508G into current MVCC histogram 508C since there is a non-zero usage count in the parent MVCC histogram 508G. This scenario is illustrated in FIG. 7A that includes a block diagram 700A of an MVCC histogram list, according to an embodiment.

In block diagram 700A, MVCC histogram list 506 includes three MVCC histograms 508: MVCC histogram 508P, MVCC histogram 508G and MVCC histogram 508C, where MVCC histogram 508C is the newest MVCC histogram 508 and MVCC histogram 508G is the oldest MVCC histogram 508. For illustrative purposes, child thread 504A references parent MVCC histogram 508P, child thread 504C references MVCC histogram 508C and child thread 504B references MVCC histogram 508G. Because respective child threads 504A-C reference the respective MVCC histograms 508C, 508P and 508G, usage counters of parent MVCC histogram 508P, grandparent MVCC histogram 508G and current MVCC histogram 508C are set to one.

When hash table 208A of child thread 504A becomes full with out-of-range descriptors, child thread 504A decrements the usage counter of parent MVCC histogram 508P to zero. However, because child thread 504B still references grandparent MVCC histogram 508G, child thread 504A does not merge hash table 208A with MVCC histogram 508P. Instead, child thread 504A decrements usage counter of MVCC histogram 508P to zero and begins referencing current MVCC histogram 508C. After child thread 504A begins referencing current MVCC histogram 508C, child thread 504A moves any out-of-range descriptors that fit the minimum and maximum criteria of MVCC histogram 508C into the in-range descriptor stack in hash table 208A, and continues scanning rows in its section of unique column 204. Child thread 504A also increments the usage counter of MVCC histogram 508C to equal two. FIG. 7B includes a block diagram 700B of an MVCC histogram list after child thread 504A references MVCC histogram 508C, according to an embodiment.

Once hash table 208B of child thread 504B that references grandparent MVCC histogram 508G includes all out-of-range descriptors, child thread 504B decrements usage counter of grandparent MVCC histogram 508G to zero (not shown). Child thread 504B then moves weights in both MVCC histogram 508G and MVCC histogram 508P into MVCC histogram 508C. Child thread 504B then removes both MVCC histogram 508P and MVCC histogram 508G from MVCC histogram list 506. Child thread 504B then merges hash table 208B with MVCC histogram 508C.

Going back to FIG. 6, block diagram 600 also includes a shared bit vector 510. Shared bit vector 510 is shared by multiple child threads 504. Child threads 504 use unique data analyzer 212 to access shared bit vector 510 and track the total unique count of values in interesting column 204, as discussed in detail in FIGS. 12A-B, below.

As discussed above, each of child thread 504A-C traverses its respective section of interesting column 204 and generates hash tables 208A-C until the traversal is complete. When each of child thread 504A-C completes traversal interesting column 204, the respective child threads 504A-C incorporate the in-range descriptors in the respective hash tables 208A-C into one of MVCC histogram 508C, 508P or 508G that respective child threads 504A-C reference, as discussed above. In an embodiment, parent thread 502, however, merges the out-of-range descriptors in hash tables 208A-C of completed child threads 504A-C in one of two scenarios.

Figure 8A:
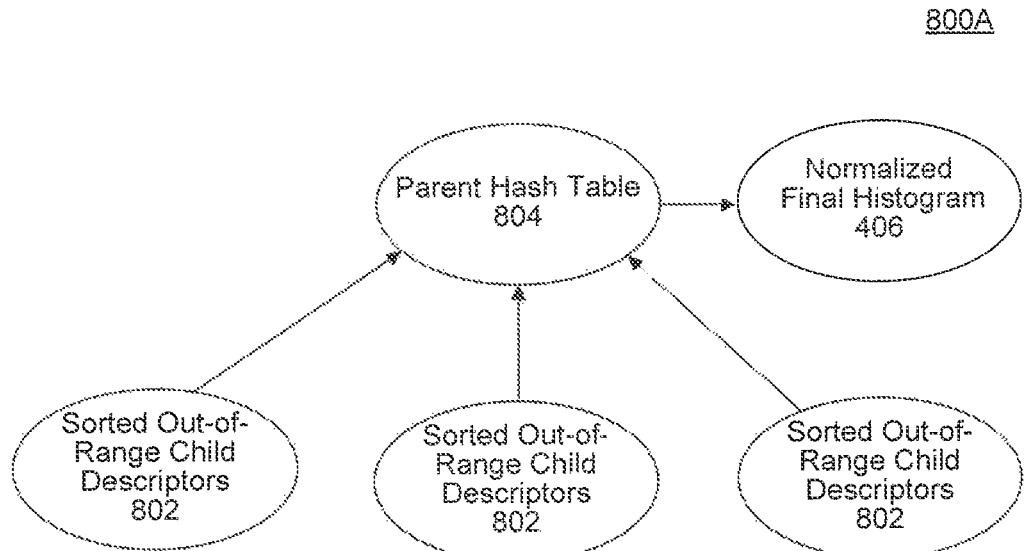
FIGS. 8A-D are block diagrams of a parent thread merging hash tables associated with child threads, according to an embodiment.
Figure 8B:
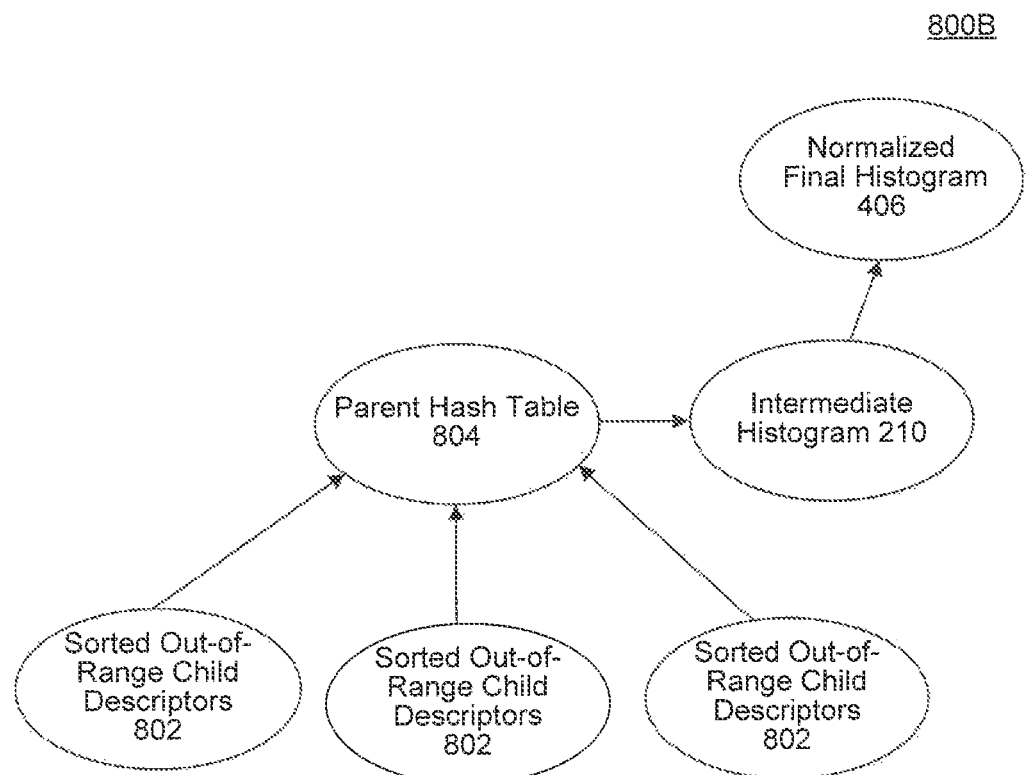

In the first scenario, child threads 504A-C do not reach a threshold of respective hash tables 208A-C and do not create MVCC histograms 508 or MVCC histogram list 506. FIGS. 8A and 8B are block diagrams 800A and 800B respectively that describe a parent thread merging hash tables associated with child threads in the first scenario, according to an embodiment.

FIG. 8A parent thread 502 uses a priority queue to merge sorted out-of-range descriptors 802 from hash tables 208A-C provided by each child thread 504A-C into parent hash table 804. The processing of sorted out-of-range descriptors may produce iterations of intermediate histogram 210. This type of processing guarantees that out-of-range descriptors with the same value will be processed contiguously and provide an accurate counter for the weight associated with each out-of-range descriptor. If the processing does not produce intermediate histogram 210, parent thread 502 converts parent hash table 804 into normalized final histogram 406, as discussed in FIG. 4. In an embodiment, normalized final histogram 406 may be an "equiweight" histogram.

FIG. 8B is an embodiment where parent thread 502 generates an intermediate histogram 210 when it merges out-of-range descriptors of hash tables 208. After parent thread 502 generates intermediate histogram 210, parent thread 502 converts intermediate histogram 210 into normalized final histogram 406 as discussed in FIG. 4. However, in this embodiment, once parent thread 502 generates normalized final histogram 406, normalized final histogram 406 will be an equiweight histogram or close to an equiweight histogram because the merging of hash descriptors and the intermediate histogram cells will combine smaller weight descriptors or cells ahead of higher weight descriptor or cells.

Figure 8C:
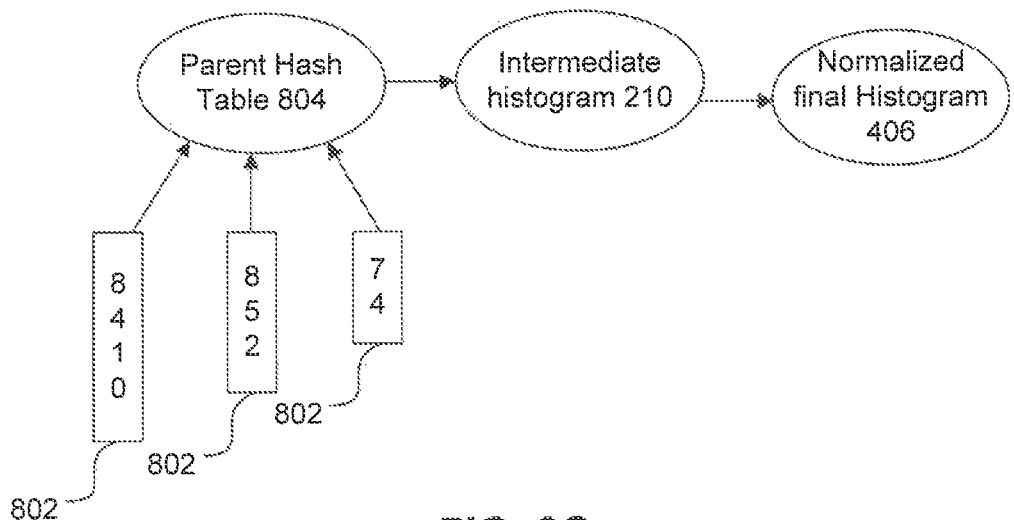
Figure 8D:
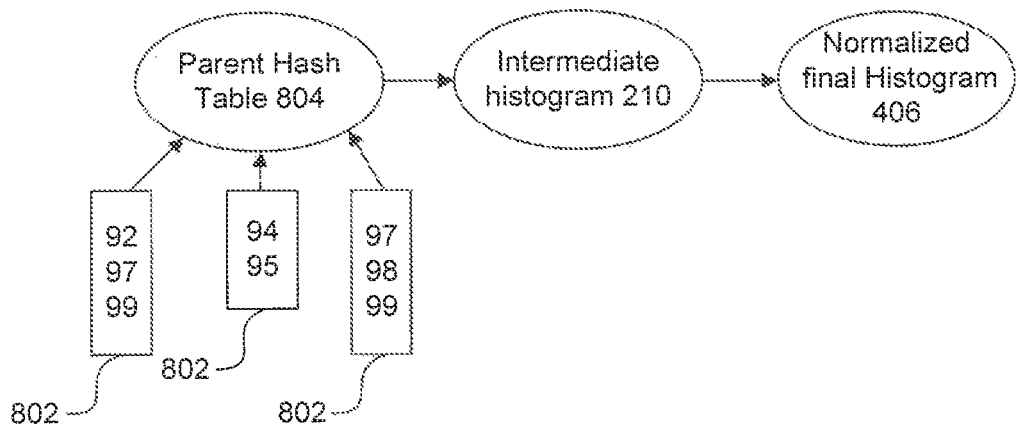

In a second scenario, at least one intermediate histogram 210 exists after child threads 504A-C complete processing. As discussed above, intermediate histogram 210 is MVCC histogram 508 but without additional functionality required for MVCC histogram list 506 manipulation. FIGS. 8C and 8D are block diagrams 800C and 800D respectively that describe a parent thread merging hash tables associated with child threads in the second scenario, according to an embodiment. In FIGS. 8C and 8D intermediate histogram 210 includes an estimated unique counter for in-range descriptors that were inserted into intermediate histogram 210 by various child threads 504. In an embodiment, parent thread 502 merges the out-of-range descriptors from various child thread 504A-C into parent hash table 804 and into intermediate histogram 210. During the merge, unique data analyzer 212 will increment the unique counter for values in interesting column 204 by the number of out-of-range descriptors. Unique data analyzer 212 is discussed in detail below with a reference to FIGS. 12A-B.

In an embodiment, parent thread 502 merges out-of-range descriptors associated with various child threads 504 in a two-step process and using the minimum and maximum range values that exits in intermediate histogram 210. For illustrative purposes, the minimum value in intermediate histogram 210 is ten and the maximum value in the intermediate histogram is ninety-one.

First, parent thread 502 merges the out-of-range descriptors that are less than the minimum value in the sorted descending order, as illustrated in FIG. 8C. In other words, parent thread 504 merges out-of-range descriptors that are less than ten in descending order.

Second, parent thread 502 merges the out-of-range descriptors greater than the maximum value in a sorted ascending order, as illustrated in FIG. 8D. In other words, parent thread 504 merges out-of-range descriptors that are greater than ninety-one in ascending order.

This type of merge ensures that parent thread 502 will process all out-of-range descriptors as out-of-range descriptors, even when a new iteration of intermediate histogram 210 occurs, as discussed in FIG. 3. This two-step merge allows unique data analyzer 212 to accurately increment the unique counter by the number of out-of-range descriptors. Unique data analyzer 212 is discussed in detail below with a reference to FIGS. 12A-B.

Once parent thread 502 completes merging hash tables 208 associated with child threads 504, parent thread 502 generates normalized final histogram 406.

Going back to FIG. 1, query optimizer 169 uses normalized final histogram 406 to generate an optimal query plan for query 102. For example, query optimizer 169 compares the data requested in the parameters of query 102 against normalized final histogram 406. Based on the comparison, query optimizer 169 determines an approximate number of records in table 180 that include the interesting parameter.

For example, suppose a query includes a request to retrieve records from a table for individuals between the ages 30 and 35 and normalized final histogram 406 includes a record for individuals between ages 30 and 40. Based on the record in normalized final histogram 406 and the associated counter, query optimizer 169 may determine the approximate number of records that table 180 includes for ages between 30 and 40, and then approximate that half of these records are for individuals between 30 and 35. Further based on the approximate number of records as compared to the total number of records in table 180, query optimizer 169 may also determine the complexity of the search and generate a query plan accordingly.

In a further embodiment, a query plan may also include a parameter that requests the names of the individuals between ages 30 and 35. Based on normalized final histogram 406, query optimizer 169 determines the approximate number of individuals, and thus a number of rows, that a query plan will need to select to retrieve their names. Based on the approximate number, query optimizer 169 may then determine whether the query plan should use an index on the name column to retrieve the names. A person skilled in the art will appreciate that an index is set on a column to improve the speed of data retrieval operations at a cost of additional writes and memory storage. For example, an index may be a copy of selected columns in a table that can be searched efficiently and has access or a direct link to the complete row of data that the index was copied from. Because, an index is a copy of a selected column, an index may require a data page lookup to obtain each indexed row, where each data page lookup incurs an associated cost. Hence, when query optimizer 169 determines that that a number of lookups is less than a predefined threshold, query optimizer 169 may include an index to lookup names associated with individuals between ages 30 to 35. On the other hand, if query optimizer 169 determines that the number of lookups are more than a predefined threshold, query optimizer 169 may determine that retrieval of the names associated with individuals between ages 30 to 35 without the index is cheaper than the combined cost of a data page lookup associated with the index. Further, the examples above are non-exhaustive, and other ways that utilize normalized final histogram 406 to optimize a query plan may be used.

Figure 9:
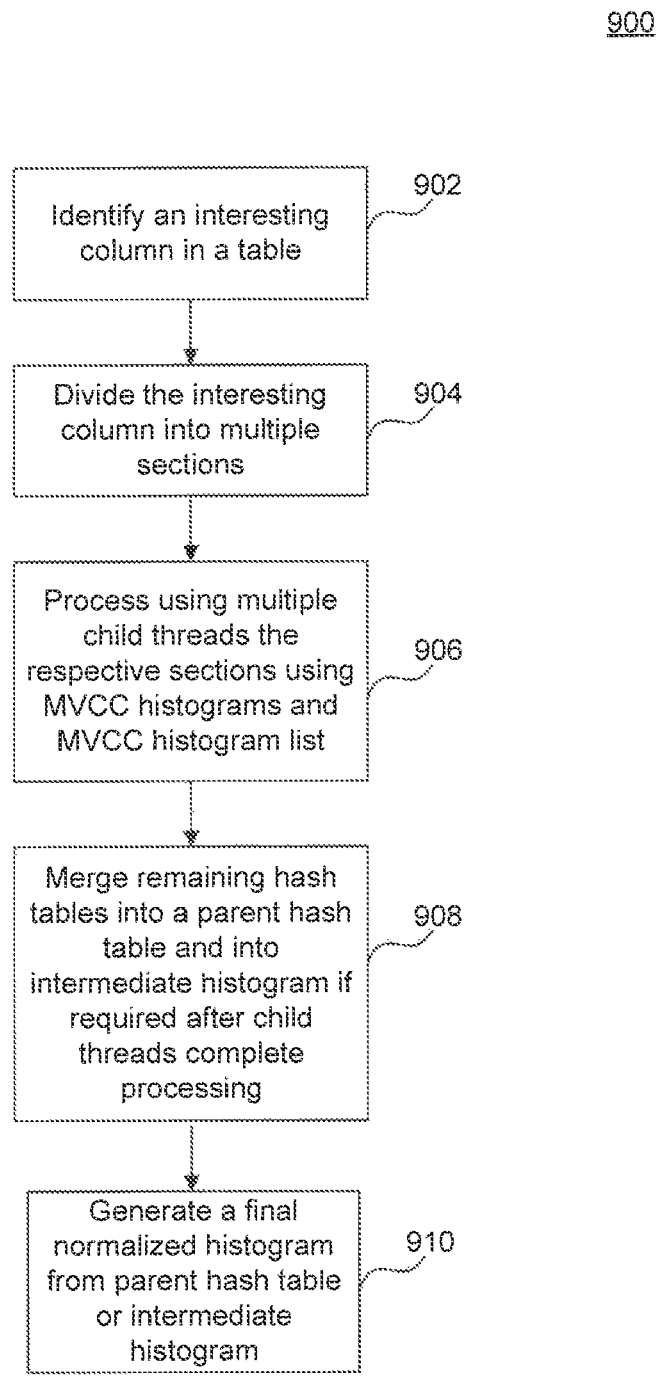
FIG. 9 is a flowchart of a method for generating a final histogram in a multi-threaded environment, according to an embodiment.

FIG. 9 is a flowchart of a method 900 for generating a histogram, according to an embodiment. Method 900 can be performed by processing logic that can comprise hardware (e.g., circuitry, dedicated logic, programmable logic, microcode, etc.), software (e.g., instructions run on a processing device), or a combination thereof. In one implementation, the method 900 is performed by histogram generator 202.

At operation 902, the histogram generator identifies an interesting column in a table. For example, interesting column 204 may be an indexed column or column that is otherwise identified as interesting column 204 in table 180.

At operation 904, histogram generator divides an interesting column into multiple sections. For example, histogram generator 202 divides interesting column 204 into multiple sections, such that a number of records in each section is approximately the same.

Figure 10:
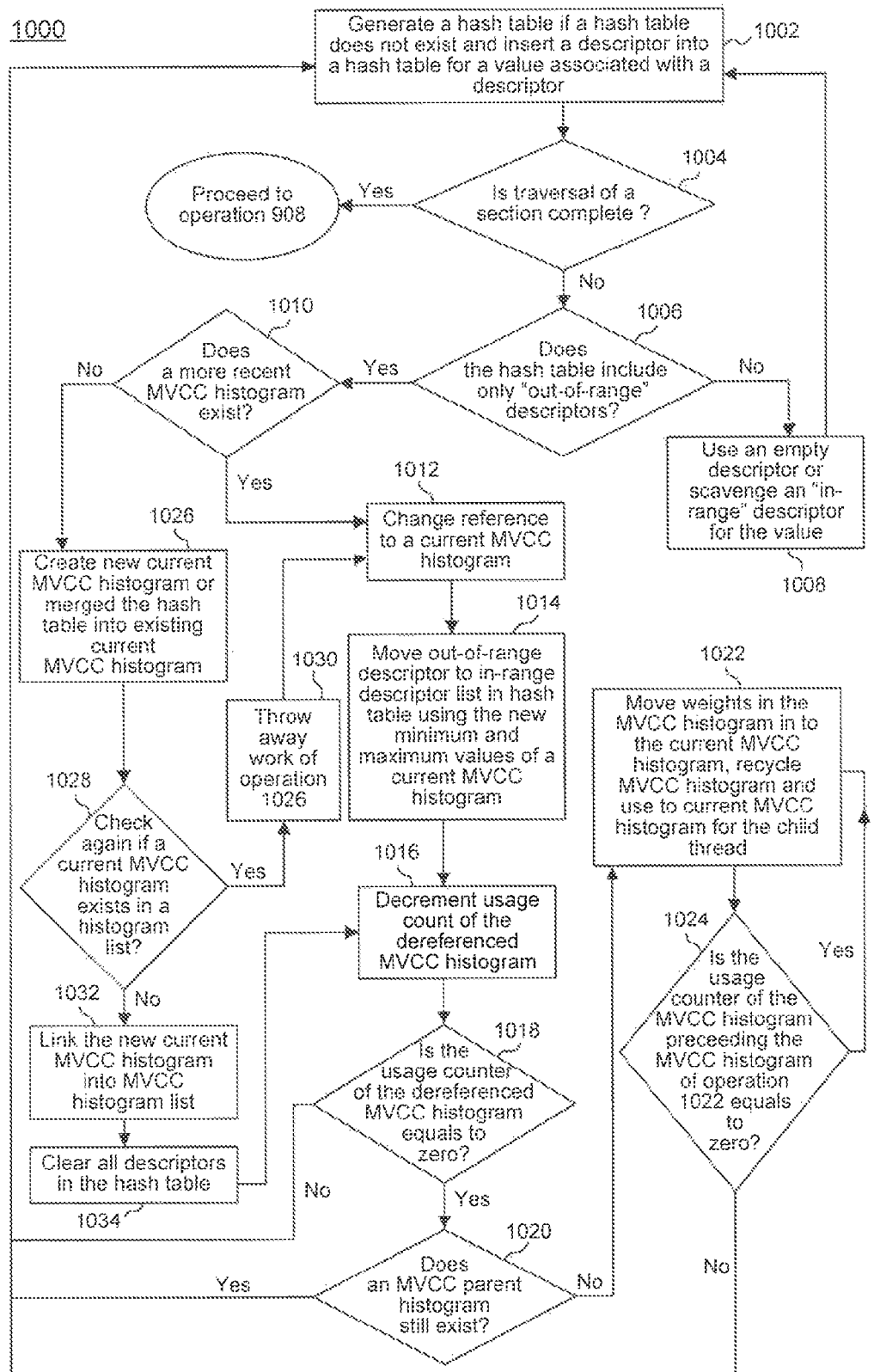
FIG. 10 is a flowchart of a method for merging a histogram into a histogram list in a multithreaded environment, according to an embodiment.

At operation 906, multiple child threads process the respective sections. For example, parent thread 502 generates multiple child threads 504A-C, where each child thread 504A-C processes an assigned section of interesting column 204. As part of processing, child threads 504A-C generate respective hash tables 208A-C and merge hash tables 208A-C into MVCC histograms 508C, 508P and 508G, stored in MVCC histogram list 506. FIG. 10 describes a method for multi-threaded processing of interesting column 204 using MVCC histograms 508C, 508G and 508P and MVCC histogram list 506, and is discussed below.

Figure 11:
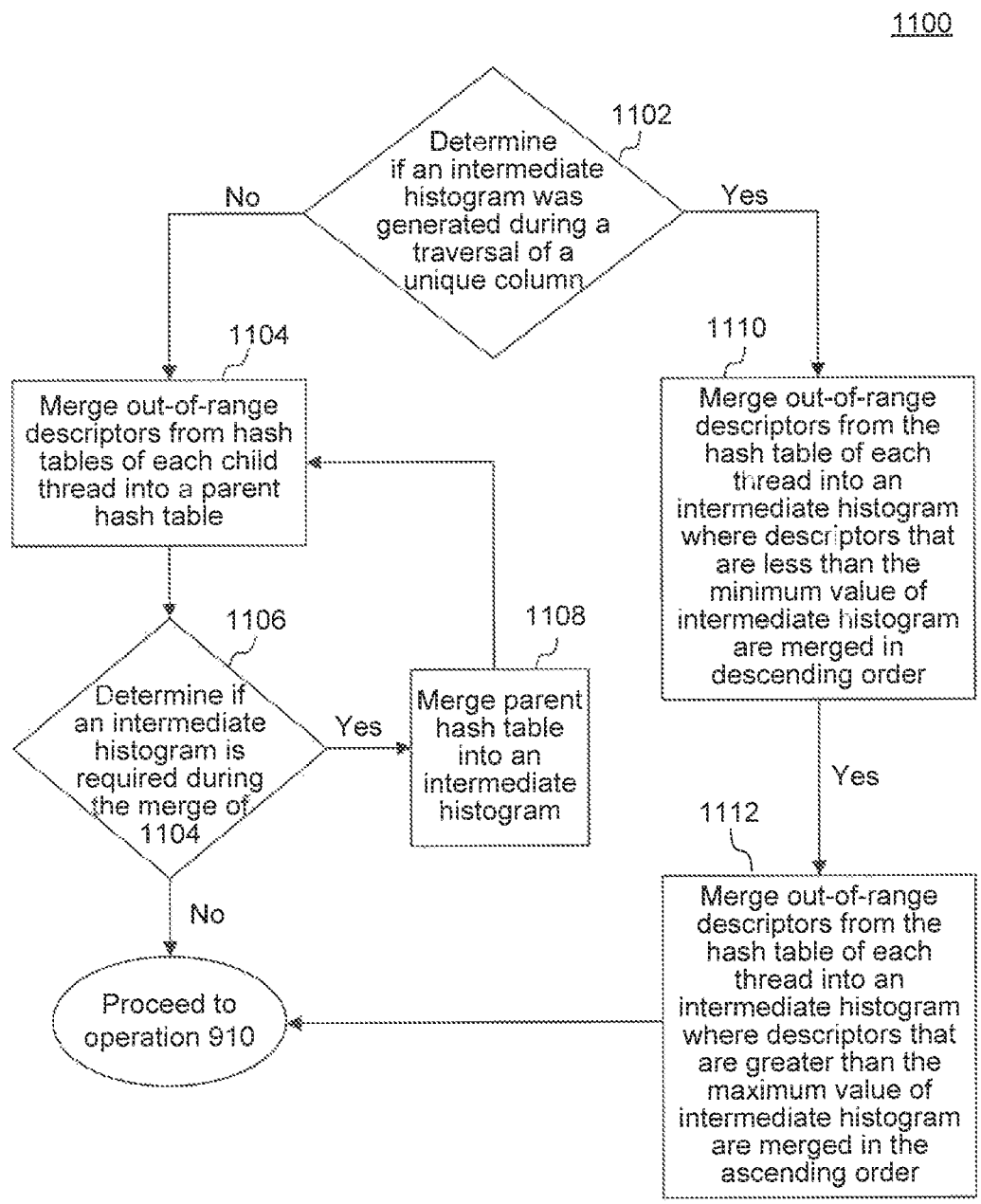
FIG. 11 is a flowchart of a method for merging hash tables of multiple child threads after child threads completed processing, according to an embodiment.

At operation 908, a parent thread generates an intermediate histogram. For example, parent thread 502 merges remaining hash tables 208A-C generated using child threads 504A-C into a parent hash table 804. As part of the merge, parent thread 502 may generate intermediate histogram 210 if required. FIG. 11 describes a method for merging hash tables 208A-C using parent thread 502, and is discussed below.

At operation 910, a normalized histogram is generated. For example, parent thread 502 generates normalized final histogram 406 as discussed in FIGS. 8A-D, above. Once generated, query optimizer 169 uses normalized final histogram 406 to generate a query plan.

FIG. 10 is a flowchart of a method 1000 for merging a histogram into a histogram list in a multithreaded environment, according to an embodiment. Method 1000 can be performed by processing logic that can comprise hardware (e.g., circuitry, dedicated logic, programmable logic, microcode, etc.), software (e.g., instructions run on a processing device), or a combination thereof. In one implementation, method 1000 repeats for each of child threads 504A-C as each of child threads 504A-C processes a section of interesting column 204, in parallel with other child threads 504A-C. For simplicity, each of child threads 504A-C is referred to as child thread 504 that generates hash table 208.

At operation 1002, a child thread generates and fills a hash table. For example, child thread 504 traverses its section of interesting column 204 and generates descriptors associated with the traversed values. Child thread 504 stores the descriptors in hash table 208 and increments a weight of the descriptor such that the weight tracks a number of times a value repeats in interesting column 204. If hash table 208 does not exist, child thread 504 first generates hash table 208.

At operation 1004 a child thread determines whether a traversal of a section is complete. If child thread 504 completes traversing its section, the flowchart proceeds to operation 908. Otherwise, to operation 1006.

At operation 1006, a child thread determines whether a hash table includes only out-of-range descriptors. For example, child thread 504 determines whether hash table 208 includes only out-of-range descriptors. If hash table 208 does not include only out-of-range descriptors, the flowchart proceeds to operation 1008. Otherwise to operation 1010.

At operation 1008, a child thread discards an empty descriptor. For example, child thread 504 determines whether an empty descriptor exists in hash table 208, and if so associates the empty descriptor with a value in interesting column 204. If an empty descriptor does not exist, child thread 504 discarded an in-range descriptor as discussed above. When operation 1008 completes, child thread 504 returns to operation 1002 and traverses the next value in its section of unique column 204.

At operation 1010, the child thread determines whether a more recent MVCC histogram exists. For example, child thread 504 determines whether MVCC histogram list 506 includes a more recent version of MVCC histogram 508 than the version it currently references. If child thread 504 references the most current MVCC histogram 508, such as MVCC histogram 508C, child thread 504 proceeds to operation 1026. However, if child thread references MVCC histograms 508P or 508O, child thread 504 proceeds to operation 1012.

At operation 1012, the child thread begins referencing a current MVCC histogram. For example, if child thread 504 was referencing MVCC histogram 508P or 508G, child thread 504 changes its reference to MVCC histogram 508C.

At operation 1014, the child thread moves out-of-range descriptors in hash table into in-range descriptors. For example, child thread 504 uses the minimum and maximum values in MVCC histogram 508C to move out-of-range descriptors into in-range descriptors in hash table 208 in accordance with the new minimum and maximum values.

At operation 1016, the child thread decrements that usage counter for a previously referenced MVCC histogram. For example, child thread 504 decrements a usage counter for MVCC histogram 508P or 508G that child thread 504 has previously referenced.

At operation 1018, the child thread determines whether a decremented usage counter of the previously referenced MVCC histogram is zero. For example, child thread 504 determines whether a usage counter of MVCC histogram 508P or 508G that child thread 504 has previously referenced is equal to zero. If the usage counter is equal to zero, child thread 504 proceeds to operation 1022, otherwise to operation 1002.

At operation 1020, the child thread determines whether a parent of the dereferenced MVCC histogram exists. For example, child thread 504 determines whether a parent of a dereferenced MVCC histogram 508 exists. For example, if parent MVCC histogram 508P was dereferenced, child thread 504 determines whether parent MVCC histogram 508P has a parent, such as grandparent MVCC histogram 508G in histogram list 506. If the parent exists, child thread 504 proceeds to operation 1002 where child thread 504 proceeds with traversing its section of unique column 204. Another child thread 504 that references grandparent MVCC histogram 508G then removes grandparent MVCC histogram 508G when it is at operation 1020 and the usage counter of grandparent MVCC histogram 508G is zero and there are no older MVCC histograms 508 exist in MVCC histogram list 506. If the parent does not exist, child thread 504 proceeds to operation 1022.

At operation 1022, the weights in the MVCC histogram are moved. For example, child thread 204 moves the weights of the previously referenced MVCC histogram 508, such as MVCC histogram 508P or 508G into current MVCC histogram 508C. Also, if any MVCC histograms 508 preceding the previously referenced MVCC histogram 508 exist with the usage counters set to zero, child thread 504 also merges the weights of these preceding MVCC histograms 508 into current MVCC histogram 508C, and recycles the previously referenced MVCC histograms 508.

At operation 1024, a determination is made whether the usage counter of MVCC histogram preceding the histogram of operation 1024 is zero. If child thread 504 determines that the usage counter of MVCC histogram 508 preceding the histogram of operation 1024 is zero, the flowchart proceeds to operation 1022, otherwise to operation 1002.

Going back to operation 1010, if a more current MVCC histogram 508, such as MVCC histogram 508C, does not exist child thread 504 proceeds to operation 1026. At operation 1026, a new current MVCC histogram 508C is generated using a copy of existing current MVCC histogram 508C. Once the new MVCC histogram 508 is generated, child thread 504 merges hash table 208 into the new MVCC histogram 5008C. If child thread 504 generates a new current MVCC histogram 508C, a previous current MVCC histogram 508C becomes parent MVCC histogram 508P, while a new current MVCC histogram 508C becomes MVCC histogram 508C. After operation 1026 completes, the flowchart proceeds to operation 1028.

At operation 1028, the child thread determines whether another current MVCC histogram was generated using another child thread 504 concurrently with operation 1026 that has already been inserted into MVCC histogram list 206. For example, child thread 504 determines whether another child thread 504 has inserted a new MVCC histogram 508C into MVCC histogram list 506 while it created its own new MVCC histogram 508C. If another child thread 504 has successfully inserted MVCC histogram 508C, child thread 504 proceeds to operation 1030, otherwise to operation 1032.

At operation 1030, the child thread deletes MVCC histogram that the child thread performs in operation 1026. For example, child thread 504 throws away the work child thread 504 performed in operation 1026 and proceeds to operation 1012 where it uses MVCC histogram 508C generated using another child thread 504.

At operation 1032, the child thread links the new MVCC histogram to MVCC histogram list. For example, child thread 504 links the new MVCC histogram 508 to MVCC histogram list 506 and the new MVCC histogram becomes current MVCC histogram 508C.

At operation 1034, the child thread 504 clears descriptors in a hash table associated with the child thread. For example, child thread 504 clears descriptors stored in hash table 208 associated with and proceeds to operation 1016 described above.

The process in flowchart 1000 continues until child threads 504 complete traversing the respective sections of interesting column 204. Once child threads 504 complete traversing their respective sections of interesting column 204, parent thread 502 merges hash tables 208 of the respective child threads 504 as described in FIGS. 8A-D and operation 908 that is discussed in detail in FIG. 11.

FIG. 11 is a flowchart of a method 1100 for merging hash tables of multiple child threads after child threads completed processing, according to an embodiment. Method 1100 can be performed by processing logic that can comprise hardware (e.g., circuitry, dedicated logic, programmable logic, microcode, etc.), software (e.g., instructions run on a processing device), or a combination thereof. In one implementation, the method 1100 is performed by parent thread 502.

At operation 1102, parent thread 502 determines whether an intermediate histogram exists after a traversal. For example, parent thread 502 determines whether any of child threads 504 generated MVCC histogram 508. If MVCC histogram 508 does not exist, parent thread 502 proceeds to operation 1104, otherwise to operation 1110.

At operation 1104, the parent thread merges hash tables associated with child threads into a parent hash table. For example, parent thread 502 merges out-or-range descriptors in respective hash tables 208A-C of child threads 504A-C into parent thread's hash table 804. In an embodiment, parent thread 502 sorts "out-or-range" descriptors in hash tables 208A-C prior to the merge so that "out-of-range" descriptors are merged in ascending order. This allows unique data analyzer 212 to accurately increment the unique count.

At operation 1106, the parent thread determines whether an intermediate histogram is needed. For example, parent thread 502 determines whether parent hash table 804 is full. If parent hash table 804 is full, parent thread 502 generates intermediate histogram 210 and flowchart proceeds to operation 1108, otherwise, to operation 910. Operation 1104 may occur at any point in operation 1104.

At operation 1108, the parent thread merges a parent hash table with an intermediate histogram. For example, parent thread 502 merges descriptors in parent hash table 804 into intermediate histogram 210, as described above. After all descriptors are merged, parent thread 502 proceeds to operation 1104.

Going back to operation 1102, if intermediate histogram 210 was generated, parent thread 502 proceeds to operation 1110. At operation 1110, parent thread 502 uses a sorted priority queue where out-of-range descriptors are sorted in the ascending order. For example, out-of-range descriptors associated with values that are greater than the maximum in-range value are merged into intermediate histogram 210 in ascending order.

At operation 1112, parent thread 502 uses a sorted priority queue where out-of-range descriptors are sorted in the descending order. For example, out-of-range descriptors associated with values that are less than the minimum in-range value are merged into intermediate histogram 210 in descending order. After operation 1112 completes, parent thread 502 proceeds to operation 910.

Returning to FIG. 2A, analyzer 170 also includes a unique data analyzer 212. Unique data analyzer 212 performs a summary analysis on interesting columns 204. For example, unique data analyzer 212 determines a number of unique values in interesting columns 204, referred to as a unique count. Below, unique data analyzer 212 is described with a reference to components in FIGS. 3 and 6.

In an embodiment, where histogram generator 202 generates one hash table 208 and where a number of descriptors is below a maximum allowable number of descriptors stored in hash table 208, then histogram generator 202 does not generate intermediate histogram 210. In this case, unique data analyzer 212 determines the number of unique values in interesting column 204 by counting the number of records in hash table 208, since each record represents a unique value (and a count of the number of times that respective unique value has been identified).

If intermediate histogram 210 or MVCC histogram 508 is needed, then unique data analyzer 212 estimates a unique count based on various thresholds and rules that may be set up by a system administrator. For example, when histogram generator 202 generates the first intermediate histogram 210, then all descriptors in hash table 208 are unique. In this case, unique data analyzer 212 increments the unique count by the number of hash descriptors. In an example where intermediate histogram 210 exists and histogram generator 202 merges hash table 208 that is full of out-of-range descriptors into intermediate histogram 210, then unique data analyzer 212 also increments the unique count by a number of out-of-range descriptors in hash table 208. Unique data analyzer 212 increments the unique count by a number of out-of-range descriptors because none of the descriptor values in hash table 208 fall into an existing intermediate histogram 210 cell, hence the descriptor values are unique.

In an embodiment, when histogram generator 202 discards an in-range descriptor from hash table 208, unique data analyzer 212 determines whether the value associated with a unique range descriptor is unique. To facilitate the determination of whether the values associated with the in-range descriptors are unique, unique data analyzer 212 generates a shared bit vector, such as, shared bit vector 510 shown in FIG. 6. In an embodiment, unique data analyzer 212 generates shared bit vector 510 when histogram generator 202 determines that intermediate histogram 210 or MVCC histogram 508 were generated during the processing of interesting column 204. In an embodiment, shared bit vector 510 may be a four megabit vector.

In the scenarios above where unique data analyzer 212 determines unique count based on a first intermediate histogram 210 or based on merging an existing intermediate histogram 210 with hash table 208 that is full with out-of-range descriptors, unique data analyzer 212 also sets bits in shared bit vector 510, where each bit is associated with a unique value. However, for these scenarios above, the bits in shared bit vector 510 may be ignored for purposes of incrementing the estimated unique count, because unique data analyzer 212 determines that descriptors in first intermediate histogram 210 and hash table 208 that includes out-of-range descriptors are unique, and increments the unique count based on the number of descriptors.

In an embodiment, where an in-range descriptor is discarded, the value associated with the discarded descriptor is merged into an existing range cell of intermediate histogram 210. In this case, unique data analyzer 212 uses shared bit vector 510 to determine whether the value associated with the in-range descriptor is a unique value or a duplicate that was previously counted in unique count. If unique data analyzer 212 determines that the in-range descriptor is associated with a new unique value, unique data analyzer 212 increments unique count. However, if unique data analyzer 212 determines that the value associated with the in-range descriptor is a duplicate, unique data analyzer 212 does not increment the unique count.

In an embodiment to determine whether a value associated with a descriptor is a duplicate, unique data analyzer 212 also tracks a number of collisions that occur when histogram generator 202 sets bits in shared bit vector 510. A collision occurs when histogram generator 202 attempts to write to a bit that has been previously set in shared bit vector 510. The number of collisions is typically less than the number of duplicate values that exist in interesting column 204. For example, the more collisions that exist in shared bit vector 510, the more duplicate values exist in interesting column 204 in table 180, whereas the fewer collisions that exist in shared bit vector 510, the less duplicate values exist in interesting column 204 in table 180. Statistically, even for a totally unique column 204, there are expected to be collisions in the bit vectors. For example, collisions may occur when unique values may have the same hash value, and when histogram generator 202 determines a modulus for the value during hashing, different hash values may select the same bit.

Mathematically, given X number of collisions on a column having Y unique values, where the number of collisions is equal to a number of bits being set, there is an assumption that $X<=Y$ where X will increase more slowly than Y, and the rate of growth is determined by how well the hash function operates on the underlying data. In order to empirically measure the effectiveness of the hash function, unique data analyzer 212 can generate a table using a known unique column 204 to estimate $Y=F(X)$. Given this estimate, unique data analyzer 212 can use the X sum of bits set to estimate $Y=F(X)$.

In an embodiment, unique data analyzer 212 may generate a unique value table, such as a Table 1 shown in FIG. 12A from a known unique column 204 for determining a number of unique values when X bits are set in shared bit vector 510.

In Table 1 of FIG. 12A, the rows have an entry at 1024 number increments of unique values in the known interesting column 204. In other words, the difference between two entries in Table 1 is 1024. In this case, if unique data analyzer 212 sets 8185 bits, the 8185 bit value may be found in the eighth row of the above table. The set 8185 bit indicates that there are 8*1024 or 8192 unique values in the sample interesting column 204.

In an embodiment, the number of bits set in shared bit vector 510 may not match exactly to the number of unique values. For this reason, unique data analyzer 212 may use interpolation to estimate the number of unique values when a bit count occurs between two entries in the table.

For example, whenever histogram generator 202 discards an in-range descriptor, unique data analyzer 212 uses the unique value table, such as Table 1 in FIG. 12A, to determine whether or not to increment the unique count. To determine whether to increment the unique count, unique data analyzer 212 calculates a false collision increment value. In an embodiment, a false collision is defined as a hash descriptor value whose hash value is already set in shared bit vector 510 even though the value is unique. To account for false collisions, unique data analyzer 212 recalculates a false collision increment value each time the total bit count (i.e. sum of bits in the hash bit vector) reaches a threshold as defined by the entry in the unique value table.

In an embodiment, the false collision increment value is a fraction which corresponds to an expected rate of unique values that will have a collision per each non-collision (i.e. a non-collision occurs when a bit is set in shared bit vector 510). Each time a new bit is set in shared bit vector 510, the false collision count is incremented by the false collision increment value. For example, if a discarded in-range descriptor has a collision, and the false duplicate count is $>-1.0$, then the unique count is incremented in spite of the collision, and the false collision count is decremented by 1.0. In an embodiment, this calculation has the effect of interpolation in that it models false collisions as a number of bits set in shared bit vector 510 increases.

In an embodiment, when the number of bits set in the shared bit vector 510 reaches a threshold of the bits available, such as 70%, though the implementation is not limited to this embodiment, then unique data analyzer 212 stops using the unique value table and instead estimates the unique count by increasing a number of unique values proportionately. For example, if 5,000,000 unique values is estimated for 100,000,000 rows in interesting column 204 when the significant threshold is reached, and another 50,000,000 rows are scanned, the unique count is incremented proportionally, or by 2,500,000. The threshold at which unique data analyzer 212 begins estimating the unique count as described above, may be configured by a system administrator.

Figure 12B:
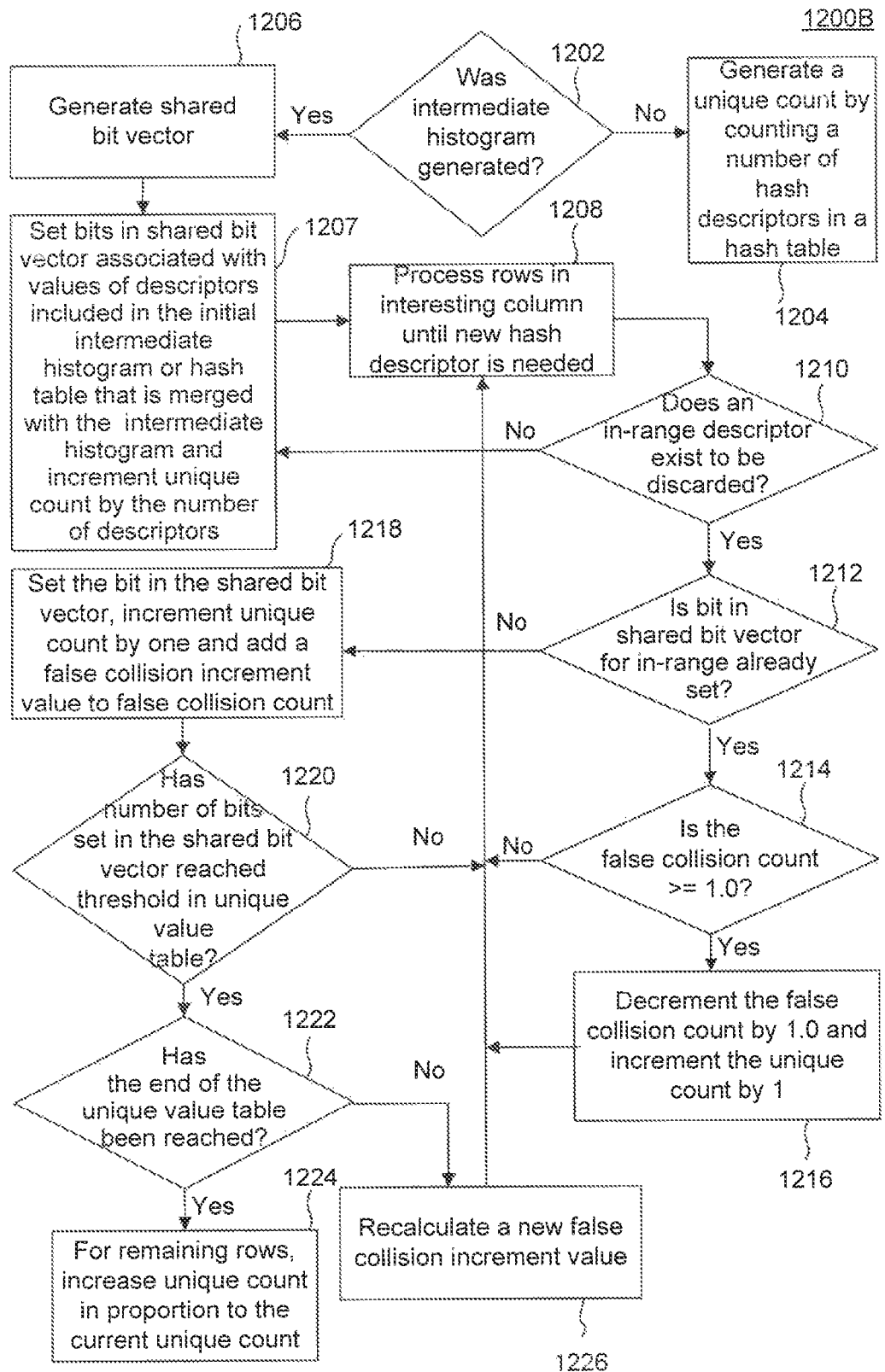
FIG. 12B is a flowchart of a method for estimating a unique count of values in the interesting column, according to an embodiment

FIG. 12B is a flowchart of a method 1200B for estimating a unique count of values in the interesting column, according to an embodiment. Method 1200 can be performed by processing logic that can comprise hardware (e.g., circuitry, dedicated logic, programmable logic, microcode, etc.), software (e.g., instructions run on a processing device), or a combination thereof. In one implementation, the method 1200 is performed by unique data analyzer 212.

At operation 1202, the unique data analyzer determines whether intermediate histogram was generated. For example, unique data analyzer 212 determines whether histogram generator 202 generated intermediate histogram 210 while traversing interesting column 204. If histogram generator 202 has not generated intermediate histogram 210, unique data analyzer 212 proceeds to operation 1204. Otherwise, unique data analyzer 212 proceeds to operation 1206.

At operation 1204, the unique data analyzer determines a unique count. As discussed above, a unique count represents a number of unique values in interesting column 204. If intermediate histogram 210 was not generated, unique data analyzer 212 generates a unique count by counting a sum of hash descriptors in hash table 208.

At operation 1206, the unique data analyzer generates a shared bit vector. As discussed above, unique data analyzer 212 generates shared bit vector 510 to track collisions that indicate duplicate values in interesting column 204.

At operation 1207, the unique data analyzer sets bits in the shared bit vector and increments the unique count. For example, unique data analyzer 212 sets bits in shared bit vector 510 corresponding to values associated with descriptors in intermediate histogram 210 when intermediate histogram 210 is an initial intermediate histogram 210 (i.e., intermediate histogram 210 was not merged with hash table 208). In another example, unique data analyzer 212 sets bits in shared bit vector 510 corresponding to values associated with out-of-range descriptors in hash table 208 that histogram generator 202 merges into intermediate histogram 210. Along with setting bits in shared bit vector 510, unique data analyzer 212 also increments the unique count by a number of out-of range descriptors in hash table 208.

At operation 1208, the unique data analyzer waits until histogram generator 202 needs to discard a descriptor in a hash table for a value retrieved from an interesting column, since no empty descriptors remain. For example, unique data analyzer 212 waits as histogram generator 202 processes rows in unique column 204 and until histogram generator 202 needs to discard a descriptor in hash table 208 since all descriptors have be used.

At operation 1210, the unique data analyzer determines whether an in-range descriptor remains to be discarded, so that histogram generator can associate the descriptor with the new value. For example, unique data analyzer 212 determines whether histogram generator 202 can scavenge an in-range descriptor that histogram generator 202 discards to associate a value retrieved from interesting column 204. If unique data analyzer 212 determines that hash table 208 is full of out-of-range descriptors unique data analyzer 212 proceeds to operation 1207, discussed above. Otherwise, unique data analyzer 212 proceeds to operation 1212.

At operation 1212, the unique data analyzer determines whether a bit in the shared bit vector that is associated with a value of an in-range descriptor is set. For example, unique data analyzer 212 determines whether a bit in shared bit vector 510 that is associated with a value of an in-range descriptor is set. If the bit in shared bit vector 510 is set, unique data analyzer 212 proceeds to operation 1214. If the bit in shared bit vector 510 is not set, unique data analyzer 212 proceeds to operation 1218.

At operation 1214, the unique data analyzer determines if a value of a false collision count is greater than 1. If the false collision count is greater than 1, unique data analyzer 212 proceeds to operation 1216, otherwise, unique data analyzer 212 proceeds to operation 1208.

At operation 1216, the unique data analyzer determines that a value associated with the in-range descriptor is a false collision. As discussed above, a false collision occurs when a descriptor is associated with a value that is set in shared bit vector 510 even though the value is unique. When unique data analyzer 212 determines a false collision, unique data analyzer 212 decrements the value of the false collision count by 1.0 and increments the value of unique count by 1. After operation 1216, unique data analyzer 212 proceeds to operation 1208.

Going back to operation 1212, when the shared bit vector for the value associated with an in-range descriptor is not set, unique data analyzer 212 proceeds to operation 1218. At operation 1218, the unique data analyzer sets a bit in the shared bit vector, increments the unique count and the false collision count. For example, unique data analyzer 212 sets a bit in shared bit vector 510 to a value associated with the in-range descriptor. Because a value in shared bit vector 510 is set, unique data analyzer 212 also increments the unique count. In an embodiment, unique data analyzer 212 also increments a false collision count by the false collision increment value. The false collision increment value is a floating number that is adjusted in operation 1226. In an embodiment, the collision increment value may be 1.0 or another value.

At operation 1220, the unique histogram generator determines whether a number of bits set in the shared bit vector has reached a threshold in the unique value table. For example, unique data analyzer 212 determines whether a number of bits set in shared bit vector 510 has reached a configurable threshold in the unique value table, such as Table 1 in FIG. 12A. As discussed above, the threshold in the unique value table may be set by a system administrator at, for example 70%. Once the number of bits in shared bit vector 510 reaches the threshold, unique data analyzer 212 begins to approximate a number of unique values in interesting column 204 at operation 1222. If the number of bits in shared bit vector 510 has not reached the threshold, unique data analyzer 212 proceeds to operation 1208.

At operation 1222, the unique data analyzer determines whether the end of the unique value table was reached. For example, unique data analyzer 212 determines whether unique column 204 includes more unique values in interesting column 204 than a number of unique values in the unique value table. If unique data analyzer 212 determines that interesting column 204 includes more unique values than the unique value table, unique data analyzer 212 proceeds to operation 1224. Otherwise, unique data analyzer 212 proceeds to operation 1226.

At operation 1224, the unique data analyzer estimates the unique count of unique values in interesting column. For example, unique data analyzer 212 increases the unique count for the remaining rows in interesting column 204 in proportion to the current unique count that represents the unique count of rows in interesting column 204 that were traversed using histogram generator 202. The increased unique count in operation 1224 is an estimate of the unique values in interesting column 204. In one embodiment, unique data analyzer 212 determines the proportion by which to increase the unique count as unique count divided by the number of rows in interesting column 204 that histogram generator 202 traversed prior to operation 1224.

If, at operation 1222, unique data analyzer 212 has not reached the end of unique value table, unique data analyzer 212 proceeds to operation 1226. At operation 1226, unique data analyzer 212 recalculates the new false collision increment value, and proceeds to operation 1208. For example, if the unique value table entry is N and the unique value generator uses Q (e.g. 1024) in which to empirically compute each entry in the unique value table (UT), then N*Q is the actual number of unique values versus the UT[N] entry which is the unique value count minus false collisions. For example, UT[N] is the statistically expected number of bits set when N*Q unique values are processed. When the bit count reaches UT[N] then a new false collision increment value is calculated as follows. The delta expected number of new false collisions for the next interval is Delta=((N+1)*Q)−UT[N+1])−((N*Q)−UT[N]). The new false collision increment value is Delta/(UT[N+1]−UT[N]). In other words, each time a new bit is set, then there is the fractional possibility of a false collision has increased by the increment rate.

Method 1200 or one or more portions of method 1200 continues until histogram generator 202 completes traversing interesting column 204 or until unique data analyzer 212 reaches operation 1224 and estimates the number of unique values in interesting column 204.

Figure 13:
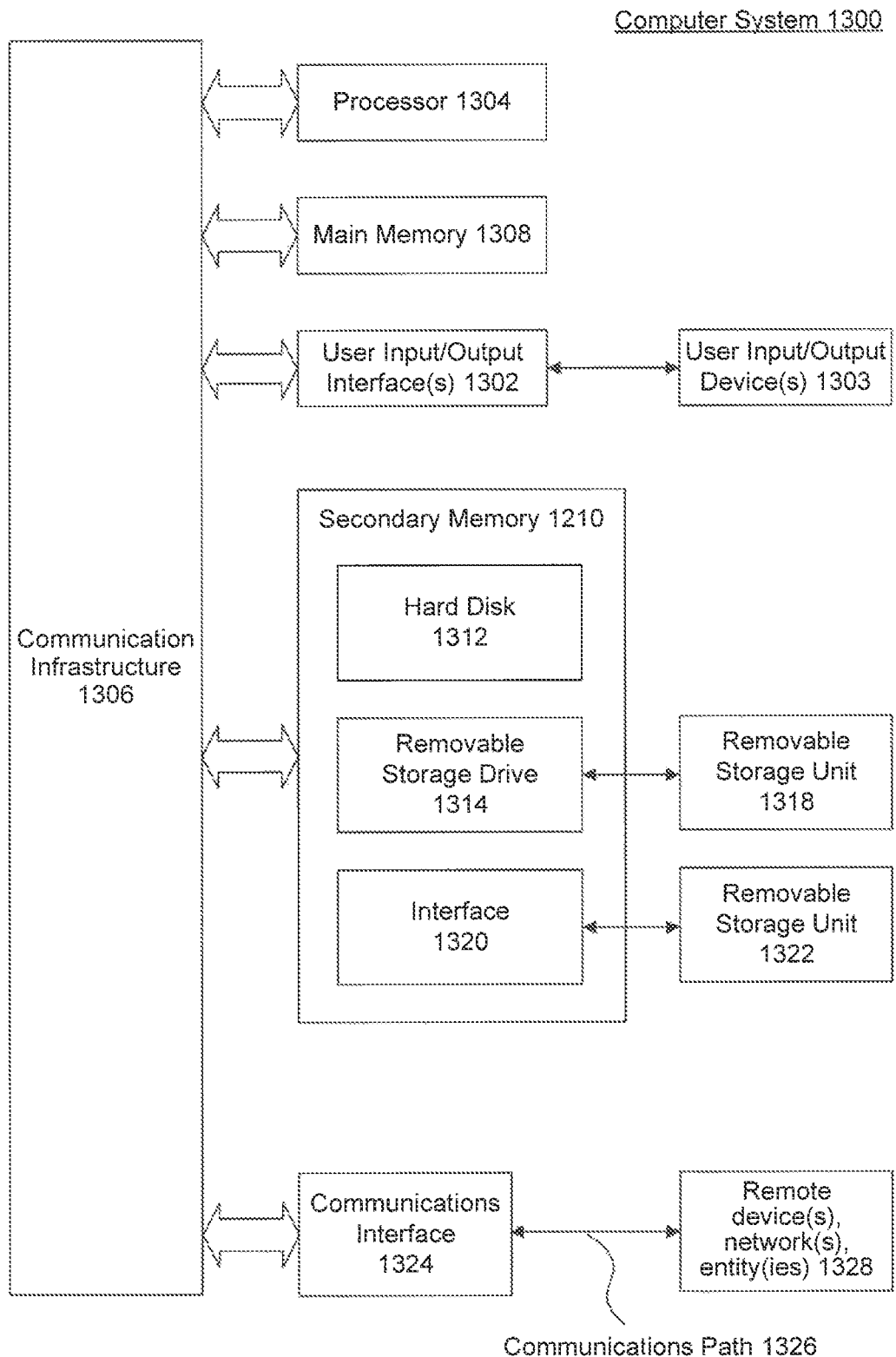
FIG. 13 is an example computer system useful for implementing various embodiments.

Various embodiments can be implemented, for example, using one or more well-known computer systems, such as computer system 1300 shown in FIG. 13. Computer system 1300 can be any well-known computer capable of performing the functions described herein, such as computers available from International Business Machines, Apple, Sun, HP, Dell, Sony, Toshiba, etc.

Computer system 1300 includes one or more processors (also called central processing units, or CPUs), such as a processor 1304. Processor 1304 is connected to a communication infrastructure or bus 1306.

One or more processors 1304 may each be a graphics processing unit (GPU). In an embodiment, a GPU is a processor that is a specialized electronic circuit designed to rapidly process mathematically intensive applications on electronic devices. The GPU may have a highly parallel structure that is efficient for parallel processing of large blocks of data, such as mathematically intensive data common to computer graphics applications, images and videos.

Computer system 1300 also includes user input/output device(s) 1303, such as monitors, keyboards, pointing devices, etc., which communicate with communication infrastructure 1306 through user input/output interface(s) 1302.

Computer system 1300 also includes a main or primary memory 1308, such as random access memory (RAM). Main memory 1308 may include one or more levels of cache. Main memory 1308 has stored therein control logic (i.e., computer software) and/or data.

Computer system 1300 may also include one or more secondary storage devices or memory 1310. Secondary memory 1310 may include, for example, a hard disk drive 1312 and/or a removable storage device or drive 1314. Removable storage drive 1314 may be a floppy disk drive, a magnetic tape drive, a compact disk drive, an optical storage device, tape backup device, and/or any other storage device/drive.

Removable storage drive 814 may interact with a removable storage unit 1318. Removable storage unit 1318 includes a computer usable or readable storage device having stored thereon computer software (control logic) and/or data. Removable storage unit 1318 may be a floppy disk, magnetic tape, compact disk, DVD, optical storage disk, and/any other computer data storage device. Removable storage drive 1314 reads from and/or writes to removable storage unit 1318 in a well-known manner.

According to an exemplary embodiment, secondary memory 1310 may include other means, instrumentalities or other approaches for allowing computer programs and/or other instructions and/or data to be accessed by computer system 1300. Such means, instrumentalities or other approaches may include, for example, a removable storage unit 1322 and an interface 1320. Examples of the removable storage unit 1322 and the interface 1320 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 1300 may further include a communication or network interface 1324. Communication interface 1324 enables computer system 1300 to communicate and interact with any combination of remote devices, remote networks, remote entities, etc. (individually and collectively referenced by reference number 1328). For example, communication interface 1324 may allow computer system 1300 to communicate with remote devices 1328 over communications path 1326, which may be wired and/or wireless, and which may include any combination of LANs, WANs, the Internet, etc. Control logic and/or data may be transmitted to and from computer system 1300 via communication path 1326.

In an embodiment, a tangible apparatus or article of manufacture comprising a tangible computer useable or readable medium having control logic (software) stored thereon is also referred to herein as a computer program product or program storage device. This includes, but is not limited to, computer system 1300, main memory 1308, secondary memory 1310, and removable storage units 1318 and 1322, as well as tangible articles of manufacture embodying any combination of the foregoing. Such control logic, when executed by one or more data processing devices (such as computer system 1300), causes such data processing devices to operate as described herein.

Based on the teachings contained in this disclosure, it will be apparent to persons skilled in the relevant art(s) how to make and use the invention using data processing devices, computer systems and/or computer architectures other than that shown in FIG. 13. In particular, embodiments may operate with software, hardware, and/or operating system implementations other than those described herein.

It is to be appreciated that the Detailed Description section, and not the Summary and Abstract sections (if any), is intended to be used to interpret the claims. The Summary and Abstract sections (if any) may set forth one or more but not all exemplary embodiments of the invention as contemplated by the inventor(s), and thus, are not intended to limit the invention or the appended claims in any way.

While the invention has been described herein with reference to exemplary embodiments for exemplary fields and applications, it should be understood that the invention is not limited thereto. Other embodiments and modifications thereto are possible, and are within the scope and spirit of the invention. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments may perform functional blocks, steps, operations, methods, etc. using orderings different than those described herein.

References herein to "one embodiment," "an embodiment," "an example embodiment," or similar phrases, indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein.

The breadth and scope of the invention should not be limited by any of the above-described exemplary embodiments, but should be defined only in accordance with the following claims and their equivalents.

What is claimed is:

1. A computer-implemented method for generating a histogram, comprising:
    initializing a first thread and a second thread, wherein the first thread processes a first section of a column in a database table and the second thread processes a second section of the column in the database table concurrently with the first thread;
    generating, with a hash function, a first hash table using the first thread and a second hash table using the second thread, wherein the first hash table represents data distribution stored in the first section of the column using a key-value pair and the second hash table represents data distribution stored in the second section of the column using a respective key-value pair, and wherein an intermediate histogram that receives values from the first hash table is generated using the first thread when the first hash table exceeds a maximum allowable number of descriptors; and
    merging the first hash table and the second hash table into a histogram, wherein the histogram represents data distribution in the column.

2. The method of claim 1, further comprising:
    normalizing the histogram into a normalized histogram; and
    generating, using the normalized histogram, a query plan for a query.

3. The method of claim 1, wherein the histogram comprises a cell range and a counter, wherein the cell range comprises a range of values in the column and the counter comprises a number of times the values in the range repeat in the column.

4. The method of claim 1, wherein a cell range in the histogram is different from a cell range in the first hash table and a cell range in the second hash table.

5. The method of claim 1,
    wherein the intermediate histogram is accessible to the second thread.

6. The method of claim 1, wherein the generating further comprises:
    determining, using the second thread, whether an available descriptor exists in the second hash table;
    based on the determining, associating the available descriptor with a value; and
    storing the available descriptor in the second hash table.

7. The method of claim 1, wherein the generating further comprises:
    determining, using the second thread, whether an available descriptor exists in the second hash table for a new value;
    based on the determining, discarding an in-range descriptor in the second hash table, wherein the discarding merges a value and a counter associated with the in-range descriptor into an intermediate histogram; and
    associating the in-range descriptor with the new value in an in-range stack of the second hash table.

8. The method of claim 1, wherein the generating further comprises:
    determining, using the second thread, whether an available descriptor exists in the second hash table for a new value;
    based on the determining, discarding an in-range descriptor in the second hash table adjacent to an out-of-range stack, wherein the discarding merges a value and a counter associated with the in-range descriptor into an intermediate histogram; and
    associating the in-range descriptor with the new value in the out-of-range stack of the second hash table.

9. The method of claim 1, wherein the generating further comprises:
    determining whether the second hash table comprises out-of-range descriptors;
    determining whether a first intermediate histogram is a current intermediate histogram;
    based on the determining whether the second hash table comprises out-of-range descriptors and whether the first intermediate histogram is the current intermediate histogram:
        generating a second intermediate histogram; and
        merging the second hash table into the second intermediate histogram.

10. The method of claim 1, wherein the generating further comprises:
    determining whether the second hash table comprises out-of-range descriptors;
    determining whether an intermediate histogram is a current intermediate histogram;
    based on the determining whether the second hash table comprises out-of-range descriptors and whether the intermediate histogram is the current intermediate histogram:
        moving the out-of-range descriptors in the second hash table into the in-range descriptors in the second hash table using minimum and maximum values associated with the intermediate histogram.

11. The method of claim 1, wherein the generating further comprises:
clearing the first hash table after the intermediate histogram receives values from the first hash table upon reaching a maximum capacity of the first hash table;
adding one or more values to the first hash table in a subsequent iteration of values from a column until one of: the first hash table reaches the maximum capacity or all the values from the column have been traversed;
clearing the first hash table into the intermediate histogram upon the maximum capacity being reached; and
merging the first hash table with the intermediate histogram upon the values from the column having been traversed.

12. The method of claim 1, wherein the first hash table includes an entry for a unique value from a column, and a counter associated with each unique value indicating a number of times the unique value has been processed from the column.

13. A system, comprising:
a memory; and
at least one processor coupled to the memory and configured to:
initialize a first thread and a second thread, wherein the first thread processes a first section of a column in a database table and the second thread processes a second section of the column in the database table concurrently with the first thread;
generate, with a hash function, a first hash table using the first thread and a second hash table using the second thread, wherein the first hash table represents data distribution stored in the first section of the column using a key-value pair and the second hash table represents data distribution stored in the second section of the column using a respective key-value pair, and wherein an intermediate histogram that receives values from the first hash table is generated using the first thread when the first hash table exceeds a maximum allowable number of descriptors; and
merge the first hash table and the second hash table into a histogram, wherein the histogram represents data distribution in the column.

14. The system of claim 13, wherein the at least one processor is configured to: normalize the histogram into a normalized histogram; and
generate, using the normalized histogram, a query plan for a query.

15. The system of claim 13, wherein the histogram comprises a cell range and a counter, wherein the cell range comprises a range of values in the column and the counter comprises a number of times the values in the range repeat in the column.

16. The system of claim 13, wherein a cell range in the histogram is different from a cell range in the first hash table and a cell range in the second hash table.

17. The system of claim 13, wherein the at least one processor is further configured to:
determine, using the second thread, whether an available descriptor exists in the second hash table;
based on the determining, associate the available descriptor with a value; and
store the available descriptor in the second hash table.

18. The system of claim 13, wherein the at least one processor is further configured to:
determine, using the second thread, whether an available descriptor exists in the second hash table for a new value;
based on the determining, discard an in-range descriptor in the second hash table, wherein the discarding merges a value and a counter associated with the in-range descriptor into an intermediate histogram; and
associate the value of the in-range descriptor with the new value in an in-range stack of the second hash table.

19. The system of claim 13, wherein the at least one processor is further configured to:
determine, using the second thread, whether an available descriptor exists in the second hash table for a new value;
based on the determining, discard an in-range descriptor in the second hash table adjacent to an out-of-range stack, wherein the discarding merges a value and a counter associated with the in-range descriptor into an intermediate histogram; and
associate the in-range descriptor with the new value in the out-of-range stack of the second hash table.

20. The system of claim 13, wherein the at least one processor is further configured to:
determine whether the second hash table comprises out-of-range descriptors;
determine whether a first intermediate histogram is a current intermediate histogram;
based on the determining whether the second hash table comprises out-of-range descriptors and whether the first intermediate histogram is the current intermediate histogram:
generate a second intermediate histogram; and
merge the second hash function into the second intermediate histogram.

21. The system of claim 13, wherein the at least one processor is further configured to:
determine whether the second hash table comprises out-of-range descriptors;
determine whether an intermediate histogram is a current intermediate histogram; and
based on the determining whether the second hash table comprises out-of-range descriptors and whether the intermediate histogram is the current in histogram:
move the out-of-range descriptors in the second hash table into the in-range descriptors in the second hash table using the minimum and maximum values associated with the intermediate histogram.

* * * * *